US012784032B2

(12) United States Patent
Malhotra et al.

(10) Patent No.: US 12,784,032 B2
(45) **Date of Patent: *Nov. 3, 2026**

(54) VIRTUAL-TO-PHYSICAL SECURE REMOTE PAYMENT TO A PHYSICAL LOCATION

(71) Applicant: AI-ID, Inc., Reno, NV (US)

(72) Inventors: Amitaabh Malhotra, San Carlos, CA (US); Laura Ann Torbett Giddings, Los Gatos, CA (US); Mohammad Anwar Khan, San Jose, CA (US); Ashok Narasimhan, San Francisco, CA (US); Aiko Nishida, Belmont, CA (US); Robert Jay Berger, Saratoga, CA (US); Sriram Krishnan, San Jose, CA (US)

(73) Assignee: ID-TX, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/961,501

(22) Filed: Oct. 6, 2022

(65) Prior Publication Data

US 2023/0105354 A1 Apr. 6, 2023

Related U.S. Application Data

(63) Continuation of application No. 16/989,814, filed on Aug. 10, 2020, now Pat. No. 11,468,432.

(Continued)

(51) Int. Cl.

| | |
|---|---|
| ***G06Q 20/36*** | (2012.01) |
| ***G06K 7/14*** | (2006.01) |
| ***G06Q 20/32*** | (2012.01) |

(52) U.S. Cl.

CPC ......... *G06Q 20/367* (2013.01); *G06K 7/1417* (2013.01); *G06Q 20/325* (2013.01)

(58) Field of Classification Search

CPC ... G06Q 20/367; G06Q 20/325; G06K 7/1417

(Continued)

(56) References Cited

U.S. PATENT DOCUMENTS

2004/0030605 A1* 2/2004 Ling .................. G06Q 30/0613 705/26.41
2019/0340622 A1* 11/2019 Azoulay ............ G06Q 30/0205

OTHER PUBLICATIONS

"Near Field Communication and Bluetooth Bridge System for Mobile Commerce," by C.Y. Leong; K.C. Ong; K.K. Tan; O.P. Gan. 2006 IEEE. International Conference on Industrial Informatics. (Year: 2006).*

* cited by examiner

*Primary Examiner* — Sara C Hamilton
(74) *Attorney, Agent, or Firm* — K&L Gates LLP

(57) ABSTRACT

A system for facilitating virtual-to-physical secure remote payment to a physical location is described. In an embodiment, a transaction bridge server receives, from a merchant computing device of a merchant user, information for a communication session between a user computing device and the merchant user; generates a digital invitation to initiate the communication session; sends a touchpoint associated with the communication session to the user computing device; receives, from an application component of the user computing device, an indication of an interaction between the user computing device and the touchpoint, the indication comprising a request to access the digital invitation; initiates the communication session between the user computing device and the merchant computing device; generates a display page customized for a user of the user computing device, the display page comprising information for a transaction with the merchant; and sends the display page to the application component of the user computing device via communication session. The user of the user (Continued)

Data Collection Flow computing device and the merchant user are most probably present at different physical locations.

6 Claims, 18 Drawing Sheets

Related U.S. Application Data

(60) Provisional application No. 62/885,133, filed on Aug. 9, 2019.

(58) Field of Classification Search
USPC ............................................................ 705/41
See application file for complete search history.

FIG. 2B
4:23
shopper.visx.demo.omnyway.net
TOP LUXE
Laptop
NO
PHOTO
AVAILABLE
EXIT
Chat
Bag

FIG. 3H
FIG. 3G
Remote Order
Remote Order

Data Collection Flow

Data Model Flow

VIRTUAL-TO-PHYSICAL SECURE REMOTE PAYMENT TO A PHYSICAL LOCATION

RELATED APPLICATIONS

This patent application is a continuation of U.S. patent application Ser. No. 16/989,814, filed Aug. 10, 2020, and also claims the benefit under 35 U.S.C. § 119(e) of U.S. Provisional Application No. 62/885,133, filed Aug. 9, 2019, both of which are incorporated by reference herein. This application is additionally related to U.S. patent application Ser. No. 16/639,977, filed Feb. 18, 2020, and U.S. patent application Ser. No. 16/983,901, filed Aug. 3, 2020, which are incorporated by reference herein.

FIELD OF THE DISCLOSURE

The present disclosure relates to methods and systems that provide virtual-to-physical secure remote payment for shoppers who purchase products from the physical store of a merchant.

BACKGROUND OF THE INVENTION

A country may have large numbers of visitors or residents from a different country every year. These visitors may have accounts at financial institutions in their home country but none in the visited country or may possess a credit or debit card that is not accepted in the visited country, making it difficult for those visitors to engage in commerce in the visited country. Most retailers in other parts of the world do not have a mechanism in place to accept alternative payment methods, especially in physical retail. Using the United States (US) as an example, in 2016, four million Chinese tourists visit the US every year, and spent about ten billion dollars on goods outside of travel, food, on lodging, averaging about $2500 per person per trip.

The US is an attractive tourist destination for Chinese tourists in particular due to the availability of a wide range of possible items, including non-counterfeit items. Chinese tourists tend to be large consumers of luxury goods and often buy in bulk, and are mostly directed by tour operators to locations where they can shop. New behaviors and the rise of visitors traveling without the benefit of a tour group require better local, personalized and real-time information for those visitors to discover products and services relevant to them based on a variety of known data, behaviors and models/algorithms distributed via a social media tools the visitors are comfortable using.

However, unlike the US, where credit cards such as MasterCard™ and VISA™, are ubiquitous, the use of these credit cards in China is very small, which means that most Chinese tourists do not have a VISA™ or MasterCard™ credit card, in which case transactions must be done in cash. A Chinese tourist can get a credit or debit card from China's UnionPay™ Bank, but this card is not accepted in many places in the US, in which case transactions again must to be done in cash. Either situation tends to restrict how much a visitor can spend in a physical store.

Furthermore, many Chinese tourists do not use credit cards at all, instead preferring to use WeChat Pay™—a payment and money transfer feature of the messaging application WeChat™—for electronic payments (rather than cash) for many day-to-day purchases, and to use AliPay™ from Alibaba™ for making online payment of goods—similar to the use of PayPal™ in the US, and may also use AliPay™ mobile app for purchases in the physical stores. As a result, there are significant barriers that prevent a Chinese tourist, for example, to engage in commercial transactions in the US. Enabling a US merchant to accept a UnionPay™ Bank credit card, a WeChat™ funds transfer, or an AliPay™ electronic transaction would require a significant and expensive change to the existing electronic payment infrastructure, and this is just in regard to two countries: Chinese visitors to the US. The same barriers may exist to prevent visitors from countries other than China and for visitors to countries other than the US. Additional infrastructure changes may be required for each additional country supported as either a source of visitors or a target destination for those visitors.

At the same time, today, local consumers or businesses cannot purchase one or more particular products remotely from a physical store within countries like US, Canada, UK, Germany, and others. Conventional online shopping solutions implemented by retailers typically do not provide the ability for a physical store associate to share a specific product or multiple products present in the physical store to high value/repeat customer(s) currently present at a different physical location than of that store. Additionally, such systems typically lack the ability to securely accept a branded or alternative payment methods remotely from its customer(s) to complete a purchase. Moreover, conventional systems often impose restrictions on merchants that prevent the ability to take remote orders directly from their repeat/high value customers in their physical stores due to security, compliance, policy, and risk concerns of receiving credit card information in a non-secure and non-traceable manner.

To provide the best service to their customers, merchants have a need to access to information about this new segment of customers, such as the shopping behavior, preferences, and previous product purchases. Additionally, merchants have a need to efficiently provide information to their customers to allow shoppers to discover their stores as well as the current products and promotions available in those stores. Thus, there is a need for a simple way to share merchant data like events, products, and promotions with the goal of having the right content pushed to the right shopper.

The shoppers need a method to receive information about events, promotions, products and merchants that is relevant to their behaviors, locations, and time. Both merchants and shoppers need an effective method to communicate with one another in order to execute a transaction or get more information about the products and services provided by the merchant. The shoppers need a method to share experiences via social media platform of their interactions with the merchant.

Thus, there is a need to allow visitors from one country to discover relevant personalized products, promotions, events and services from domestic merchants in a social marketplace environment, communicate with the merchants' store associates, perform secure remote commercial transactions at those merchant physical stores in the absence of a commonly supported payment instrument, and share experiences with peers and other visitors. Additionally, there is a need for retailers to accept returned merchandise and refund the purchase amount to the original digital wallet.

In many conventional systems, machine readable optical labels can be implemented that contain information about items to be purchased by a customer, as well as to facilitate payment. In some systems (such as WeChat Pay), a Quick Response (QR) code can be implemented to perform that functionality. The use of QR codes, however, presents implementation challenges for merchant at their point of sale since a particular method of payment may involve a distinct QR code. Thus, for a merchant to support multiple payment methods, the merchant may need to maintain multiple QR codes. Thus, there is also a need to support multiple payment digital wallets on the same physical or virtual payment QR Code.

SUMMARY OF THE INVENTION

Aspects of the present disclosure address the above noted and other deficiencies by implementing methods and systems for providing a social marketplace with universal, global, virtual-to-physical payment adapter with secure remote payment at a physical location. Various aspects of the present disclosure allow foreign visitors having foreign bank accounts access to domestic payment instruments directed to remote payment of items offered by merchants at physical stores. In some embodiments, aspects of the present disclosure are directed to the secure remote payment extension of methods and systems for providing a universal, global, virtual-to-physical payment adapter where the foreign visitor can engage in a transaction with the domestic merchant over phone, text, direct message, email, chat, chatbot, photo share, video share, voice share, and social media platform henceforth known as a variety of communications methods. In some embodiments, aspects of the present disclosure are directed to the gathering, modeling, and distribution of personalized content with a secure remote payment transaction at a physical store location by a shopper from a remote location via a social marketplace interface. In some embodiments, aspects of the present disclosure are directed to the refunding of money via the system and methods described, thereby retrieving funds from the physical store location and returning those funds to the digital wallet of the purchaser. In some embodiments, aspects of the present disclosure are directed to the encoding of information in a single payment universal QR Code (also referred to herein as a “liquid” QR code) and an intelligent system behind selection of the consumer’s preferred payment solution.

Aspects of the present disclosure provide the physical and logical infrastructure to enable a secure remote universal interface between any type of payment or money transfer system and any payment acceptance system, bridging the gap between systems that transfer funds (but that cannot directly process purchases) and the payment acceptance systems that process such purchases (such as VISA™, Discover™, MasterCard™, BharatQR, WeChat Pay™, and other similar payment systems used by merchants). Furthermore, aspects of the present disclosure provide the logical and physical infrastructure to provide relevant and personalized information via a social media marketplace platform with a mechanism to provide direct communication between shopper and merchant to transact remotely at the physical store and share that experience with others. In some embodiments, certain functionality is provided by a transaction bridge system (such as the Omnyway™ Payment Server (OPS)), which may include software, circuitry, processors, memory, and/or other hardware. The functions of a transaction bridge system/OPS may be distributed among multiple hardware entities and may be distributed across multiple physical, geographic, and/or logical locations.

In one application, for example, the methods and systems disclosed herein provide a secure remote access to the bridge between social or mobile wallet applications that allow transfer of funds from person to person (e.g., Venmo™, Zelle™ and others) and traditional payment methods including prepaid, debit, and credit cards (in physical or digital/virtual form) as currently accepted by the existing payment acceptance infrastructure. Such an application may be referred to as a Remote-Virtual-To-Physical Payment (RV2PP) application or service. In this application communication may be via a variety of communications methods. Fulfillment of the product or service may be via a variety of options including, but not limited to shipment (physical/electronic), pickup, or other delivery options such as courier, personal shopper, etc.

In another application, for example, the subject of the present disclosure enables visitors from one country to receive within a social media context relevant and personalized content from the system about products and services to make remote purchases, payments, or other transactions using the financial systems of another country. In one embodiment, methods and systems of the present disclosure offer a visitor to another country the freedom to use the visitor’s preferred mobile payment method to do a secure remote purchase transaction at physical retail stores in countries that they are visiting or have visited.

In an illustrative example, Chinese tourists can receive within a social media context like WeChat™, relevant and personalized content from the system about products and services in order to transact and make payments at US merchants using payment mechanisms already extant in the US. According to one embodiment, which will be described in more detail below, such a transaction may take place at a backend server in China (via WeChat™, or AliPay™, for example) while the US merchant is paid in dollars, with no change required at the merchant’s Point Of Sale (POS) front-end. In this scenario, the visitor may not physically be at the merchant POS, so is sent a payment code link via a variety of communications methods to open in the payment wallet. The code established establishes a secure link between the visitor’s payment method and the store payment mechanism (physical card, virtual card, ecommerce system or other digital means). The code also establishes visitor intent to purchase the products or services from the merchant. Once the visitor part of the transaction is completed and verified, the merchant finishes the payment using the store payment mechanism. The above scenario is extensible and applicable to all combinations of visitor payment, merchant payment acceptance, social media, communication mechanism, and fulfillment option. Such applications for either scenario may be referred to as a Social Marketplace and Remote Payment (SMRP) application or service. It will be understood that RV2PP and SMRP may be considered different aspects of the services provided by a transaction bridge system/OPS.

Aspects of the present disclosure provide utility far beyond enabling global visitor discovery and transactions. They can be used to provide via a social marketplace with personalized and relevant recommendations and provide a secure remote link to connect any type of payment or money transfer system with any payment acceptance system in one or more countries, whether the two systems are in the same country or in different countries. As such, the term “foreign” is used to mean “foreign to the existing payment acceptance infrastructure” rather than “foreign country”—although in some scenarios the payment or money transfer system and/or the payment acceptance infrastructure may indeed be in a foreign country or in different countries from each other.

In conventional systems, most merchants cannot accept remote orders over the phone due to security, compliance and risk concerns. Significant business is missed because of this. An advantage that aspects of the present disclosure have over such systems is that subject matter of the present disclosure allows secure remote order capability over the phone and the system can the use of pre-existing in store payment systems without modification, e.g., requiring no software or hardware change in the existing POS system of a merchant.

According to one aspect of the present disclosure, a method for providing for providing a providing a social marketplace with universal, global, Remote-Virtual-To-Physical payment adapter comprises creation of a secure link (abstractly defined) with the physical store, payment instrument and amount in the merchant's currency; upon activation of that link by the shopper it receives information associated with a desired domestic transaction, the information including information identifying a user and an amount in a first currency; converting the amount in the first currency to an amount in a second currency; sending information including the amount in the second currency; receiving an instruction to initiate the desired transaction; sending, to a foreign bank, a request to authorize the desired transaction, the request including information for identifying the user and the amount in the second currency; receiving, from the foreign bank, authorization of the desired transaction, the authorization including information identifying the user; determining a card number or otherwise identifying a payment instrument associated with the identified user; sending, to a domestic bank, a request that funds be added to the payment instrument and/or that a credit limit of the payment instrument be changed; receiving, from the domestic bank, a result of that request; and sending, to the identified user, an instruction to present the payment instrument to a merchant involved in the desired transaction.

According to another aspect of the present disclosure, a transaction bridge system (e.g., Omnyway™ Payment Server (OPS) server) provides a social marketplace with universal, global, remote-virtual-to-physical payment adapter comprises at least one processor, and memory comprising instructions executable by the at least one processor whereby the process is adapted to operate according to any of the methods of the present disclosure.

According to another aspect of the present disclosure, the transaction bridge system (OPS server) provides secure links to be distributed by a variety of communication methods comprises at least one processor, and memory comprising instructions executable by the at least one processor whereby the process is adapted to operate according to any of the methods of the present disclosure.

According to yet another aspect of the present disclosure, the transaction bridge system (OPS server) provides a social marketplace with universal, global, remote-virtual-to-physical payment adapter comprises one or more modules whereby the OPS server is adapted to operate according to any of the methods of the present disclosure.

According to yet another aspect of the present disclosure, the transaction bridge system (OPS server) provides a social marketplace with universal, global, remote-virtual-to-physical payment adapter is adapted to operate according to any of the methods of the present disclosure According to yet another aspect of the present disclosure, a computer program comprises instructions which, when executed on at least one processor, cause the at least one processor to carry out any of the methods of the present disclosure.

According to yet another aspect of the present disclosure, a carrier contains the computer program above, wherein the carrier is one of an electronic signal, an optical signal, a radio signal, or a computer readable storage medium.

According to yet another aspect of the present disclosure providing a social marketplace with universal, global, remote-virtual-to-physical payment adapter, an OPS may present personalized relevant information about participating local merchants' offers and/or product and/or service information graphically, in text, or in voice to (local or traveler) users through social media app, mobile app, or a personal computer to show merchants using remote-virtual-to-physical payment adapter to users, and may also incentivize users through discounts or offers to visit and make purchases at participating local merchants using computer program comprises instructions which, when executed on at least one processor, cause the at least one processor to carry out any of the methods of the present disclosure.

According to one aspect of the present disclosure, a method for providing a social marketplace with universal, global, remote-virtual-to-physical payment adapter comprises: creation of a secure link (abstractly defined) with the physical store, payment instrument; upon activation by the shopper, receiving first information associated with a desired transaction, the information comprising information identifying a user and an amount; sending, to a first financial entity, a request to authorize the desired transaction, the request comprising information for identifying the user and the amount; receiving, from the first financial entity, authorization of the desired transaction, the authorization comprising information identifying the user; determining a payment instrument or financial account to be involved in the transaction; sending, to a second financial entity, a request to prepare the payment instrument or financial account for the desired transaction; receiving, from the second financial entity, a result of that request; and sending, to the identified user, an instruction to initiate the desired transaction.

In some embodiments, the secure link is an encoded graphical representation of the data. In some embodiments, the secure link is a button, web link or other graphical selection item in a mobile or personal computer application that is representation of the data. In some embodiments, the first financial entity and the second financial entity comprise domestic banks In some embodiments, the first financial entity comprises a foreign bank and wherein the second financial entity comprises a domestic bank; or the first financial entity comprises a domestic bank and wherein the second financial entity comprises a foreign bank and wherein receiving the first information comprises receiving the first information from a mobile application or personal computer of the user.

In some embodiments, receiving the information identifying an amount comprises receiving information identifying an amount in a first currency and wherein the method further comprises, prior to sending the request to authorize the desired transaction: converting the amount in the first currency to an amount in a second currency; sending the amount in the second currency to the user for approval; and receiving from the user approval to send the request to authorize the desired transaction.

In some embodiments, determining the payment instrument or financial account to be involved in the transaction comprises determining a payment instrument to be involved in the transaction; sending the request to prepare the payment instrument or financial account for the desired transaction comprises sending a request that funds be added to the payment instrument and/or that a credit limit of the payment instrument be changed; and sending the instruction to initiate the desired transaction comprises sending an instruction to present the payment instrument to a merchant involved in the desired transaction for processing by the merchant.

In some embodiments, receiving the first information further comprises receiving information identifying a Point Of Sale, POS, terminal or other merchant equipment for performing a transaction; determining the payment instrument or financial account to be involved in the transaction comprises determining a financial account associated with the merchant equipment; sending the request to prepare the payment instrument or financial account for the desired transaction comprises sending a request that funds be added to the financial account and/or that a credit limit of the financial account be changed; and sending the instruction to initiate the desired transaction comprises sending an instruction to request the merchant to process the desired transaction using the financial account associated with the merchant equipment.

In some embodiments, the method further comprises: receiving an indication of the result of the processed transaction; and notifying the user of the result of the processed transaction.

In some embodiments, the method further comprises: presenting personalized and relevant participating local merchants' offers and/or product and/or service information graphically, in text, or in voice to users; identify merchants that support the services provided by the payment server; and/or incite users through discounts or offers to visit and make purchases at participating local merchants.

In some embodiments, the method further comprises: providing notifications to the user via a variety of communications methods.

In some embodiments, the method further comprises: collecting merchants' and shoppers' behavioral data, product data, transaction data, pricing and promotion data, location data, time data, review data, and any other data that encompasses the system, henceforth known as "the data".

In some embodiments, the method further comprises: creating models based on features derived from "the data". Models will be generated from a variety of algorithms utilized for clustering, classification and regression (both logistical and linear). Models derived will be used for shopper and merchant segmentation, product, audio and image categorization, and text analysis for mining customer sentiment, price and promotion sensitivity and time-series forecasting (customer lifetime value, churn, probability of purchase). Models will also be derived to match shopper profile, location, behavior, reviews and preferences to present recommendations of merchants, promotions, products and services to the shopper. Models will also be derived to predict the probability of purchase given the shopper profile, location, behavior, preferences and products/promotions available. Models will also be developed to predict the probability of purchase given a specific event (such as seeing or clicking an ad, prior purchase, etc.) and predict mean time to purchase using conditional hazard/survivor analysis techniques.

In some embodiments, the method further comprises: taking event and other data in real-time and running it through machine learning algorithms to improve the efficiency and success rate of the models over time.

In some embodiments, the method further comprises: handling edge cases where the shopper is required to enter a payment amount through an interface, and the system is able to correct for mistakes made by the user when entering the required amount. In the case that the user enters an amount higher than what is due, the system allows for the transaction to go through for the validated amount and refunds the excess back to the user. In the case where the user enters an amount that is less than the amount required, then the system will deny the transaction by the user, and request that the user pay the balance, or cancel the entire transaction. If the user selects the former, then the user is prompted to pay the exact extra amount required and is thus able to complete the purchase. In the latter, the user is refunded any previous amounts they may have authorized for the transaction.

In some embodiments, the method further comprises: handling edge cases to improve the security of the transaction by applying controls on the physical card or virtual card. In cases where either the shopper or retailer associate is not completing the transaction within certain timeframe, controls are added to only have the card ready for a limited amount of time—enough to complete the transaction, but no more. If the physical card or virtual card has a timeout event, after digital part of the payment is completed, but before the merchant side is completed—the shopper will be refunded automatically the amount of the transaction. Handling the case where a person tries to make a transaction with the card outside specific location parameter (MID, MCC, Geolocation, other key mappings, the system through a variety of card controls can limit the transaction to a specific merchant and merchant location. In the case where a person tries to run multiple transactions outside the normal boundaries of store usage or tries to run amounts outside the normal store usage, the system through a variety of card controls place controls to limit the transaction amounts to stay within expected boundaries.

In some embodiments, the method further comprises: handling a refund of a purchase. This can be handled via backend mapping or via user initiated mapping. In the case of backend mapping, the transaction ID of original transaction gets conveyed to the OPS. The OPS maps this to the original transaction and user associated with the payment made on the social marketplace, wallet or payment system. When merchant processes the refund, the funds flow back to the method of payment at the POS. The OPS monitors the receipt of funds from the merchant system, and then initiates a refund to the shopper associated with the original transaction. In the case of user initiated mapping, the user requests a refund through the social marketplace, app or wallet and highlights the receipt of the transaction or the transaction entry that needs to be refunded. The merchant then completes a refund to the merchant card. The OPS monitors refund activity for the payment card, and then maps it by amount and merchant ID to the user initiated refund request on the social marketplace, wallet or app. In a third embodiment of this flow, the merchant asks the user to scan or enter a code—numeric, QR Code, barcode or any such form, into the social marketplace or app or wallet. This code identifies the transaction being refunded to the OPS. This allows the OPS to wait for a completion of refund at the merchant end, after which the funds are refunded to the user that scanned or entered the merchant provided code. The utility used by the merchant to create the refund code can be a website, app or even a system prompt from the POS. The code can be a static code or a per transaction one time code.

In some embodiments, the method further comprises: creating a universal or "Liquid" QR Code scheme that allows the merchant to have single QR Code in the checkout aisle for payment (for example the same QR Code could support WeChat Pay™, AliPay™, PayPal™, Pay™, Venmo™, LINE Pay™, etc.).

In various implementations, the QR code format can be implemented with the following principles:

The QR code should be opaque, i.e., QR code data by itself should not reveal underlying data. The QR data can be resolved via a call to the Omnyway™ resolver API.

The QR code should be un-forge-able, i.e., it should not be possible for non-Omnyway™ actors to be able to generate a valid Omnyway™ QR code data. The only way to generate a valid QR code would be through making an API service call to Omnyway™ platform.

The QR code should follow a globally acceptable standard. The format used by Omnyway™ follows the IETF/W3C URN (Uniform resource name) [1] scheme. The structure of a URN string is as follows:

```
namespace specific string. Omnyway ™ uses the nid of "owrid" to
identify the resource as Omnyway ™ Resource Id and a name space that
is
extensible as shown below
<nss> := <AppId>:<ResourceId>,<Signature>
<AppId> can be one of "id"(User Id for Mobile Client) "zb" (ZapBuy),
"po" (POS Id), "pa" (Payment Info),
<ResourceId> is a machine generated identifier, could be a UUID
<Security Checksum> is a Sha256 HMAC of the AppId+ResourceId,
signed using a secret key
```

This scheme is relatively close to a URL type approach, but does not have the benefit of being directly dispatchable from a Browser. Resolving a owrid URN would require a call to Omnyway™. To make this a standardized URN will require registering with the IETF using a detailed RFC process.

The single QR Code uses a cloud based service to maintain a lookup table, to redirect the shopper to their preferred payment method. When a consuming service—be it a mobile app or a merchant app or point of sale scans the QR code, the service can pass the QR Code string to OPS. OPS will review if the resource id is indeed a Omnyway™ resource. If it is an Omnyway™ resource, it will first validate the security checksum and only then will map the resource id to its parts including—static and dynamic parts and invoke the appropriate micro-service to initiate action on the QR code. If it is not an Omnyway™ resource id, Omnyway™ looks up Liquid QR code services registry and invokes an associated external service. OPS interfaces with 3rd party profiling and behavioral engines and maintains a history of the user. The system further provides user intelligence as well as a scalable and customizable platform for handling QR Code based payments for digital wallets.

In some embodiments, the method further comprises: applying the system (with vertical specific adaptations) to support more vertical markets such as dining, hotels, and entertainment.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION

Figure 1:
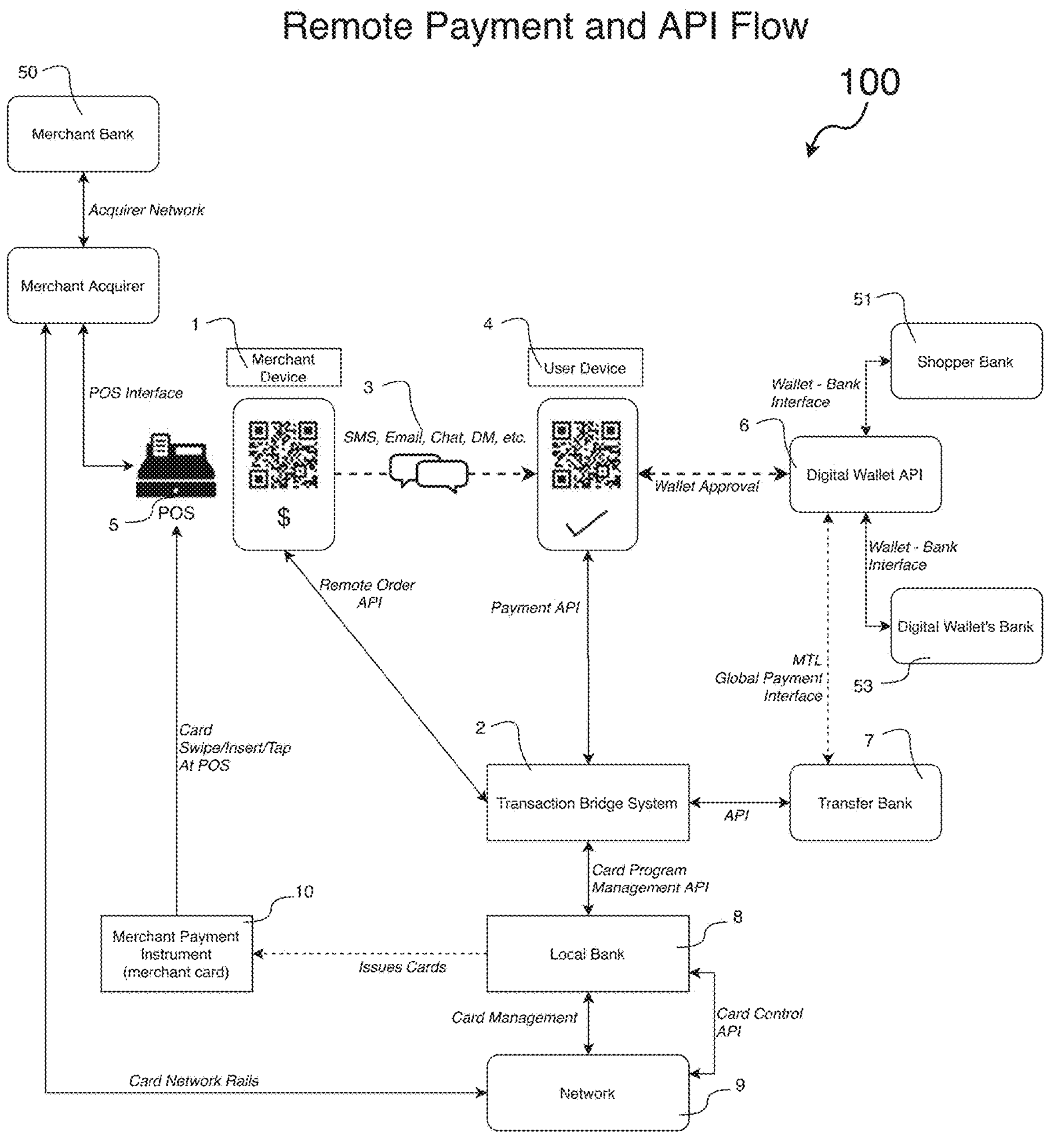
FIG. 1 depicts a block diagrams illustrating an exemplary system for providing methods and systems for a universal, global, virtual-to-physical payment adapter for secure remote payment at a physical location according to embodiments of the present disclosure.

The embodiments set forth below represent the information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Methods and systems for providing a universal virtual to physical payment adapter with secure remote payment at a physical location are presented herein. The subject matter of the present disclosure provides the physical and logical infrastructure to provide a universal interface between any type of payment or money transfer system and any payment acceptance system, and specifically bridges the gap between systems that transfer funds but can't directly to make purchases, and the payment acceptance systems that process such purchases (such as VISA™, Discover™, MasterCard™, AliPay™, WeChat Pay™, BharatQR and other systems used by merchants).

In one application, for example, the methods and systems disclosed herein provide a bridge between social or mobile wallet applications that allow transfer of funds from person to person (e.g., Venmo™, Zelle™ and others) and traditional payment methods including prepaid, debit, and credit cards (in physical or digital form) as currently accepted by the existing payment acceptance infrastructure.

In another application, for example, the subject of the present disclosure enables visitors from one country to make purchases, payments, or other transactions using the financial systems of another country. For example, Chinese tourists can transact secure remote payments at US merchants using payment mechanisms already extant in the US. According to one embodiment, which will be described in more detail below, such a transaction may take place at a backend server in China (via WeChat™, for example) while the US merchant is paid in dollars, with no change required at the merchant's Point Of Sale (POS) front-end. Such an application may be referred to as a Omnyway™ Payment Server (OPS) application or service.

The methods and systems of the present disclosure have utility far beyond enabling global traveler remote payments, however: they can be used to connect any type of payment or money transfer system with any payment acceptance system in one or more countries, whether the two systems are in the same country or in different countries. As such, the term "foreign" is used to mean "foreign to the existing payment acceptance infrastructure" rather than "foreign country"—although in some scenarios the payment or money transfer system and/or the payment acceptance infrastructure may indeed be in a foreign country or in different countries from each other.

A significant advantage that the methods and systems of the present disclosure have over prior art systems is that subject matter of the present disclosure allows the use of pre-existing payment systems without modification (e.g., without software or hardware changes to the existing POS system of a merchant). Merchants can accept secure, traceable, authenticated payments remotely, thus significantly reducing security exposure within the system, including, but not limited to eliminating the need to secure PII data, reducing chargeback risks, and reducing fraud risks.

Aspects of the present disclosure can allow shoppers to make purchases by interacting with a touchpoint (which may be associated with a particular transaction and/or may have been generated specifically for a particular transaction). The touchpoint may be a machine readable optical label (e.g., such as a Quick Response (QR) code, a product Universal Product Code (UPC) code, a product Stock Keeping Unit (SKU) #), a radio-frequency readable passive or active device (e.g., a near-field communication) NFC tag, an NFC enabled computing or point-of-sale (POS) device, a radio-frequency identification (RFID) tag, an RFID enabled computing or POS device, or a Bluetooth® enabled computing device or merchant POS device), a product offer, a product coupon, a product promotion, a product image, an email message containing product information and/or a uniform resource locator (URL) link, a text message containing product information and/or a URL link, a message posted to a social media account of a user that includes product information and/or a URL link, a message posted on a web page to a user that includes product information and/or a URL link, or any other specific image (defined for such purpose) using a shopper device camera, and without downloading any app or prior activation of any device resident utility. A product could be one or more items, or one or more services.

As used herein, the term "application", when used as a noun, refers to a software program that runs or is hosted on a computing device, such as a personal computer, smartphone, or other electronic device. An application may alternatively be referred to as "an app", "web app" or "social app". Interfaces can be visual, tactile or audible.

FIG. 1 is a block diagram illustrating an exemplary system 100 for providing a universal, global, virtual-to-physical payment adapter with secure remote payment at a physical location, according to one embodiment of the present disclosure.

As shown in FIG. 1, a transaction bridge system 2 (such as an Omnyway™ Payment Server (OPS)) can act as an intermediary to coordinate transfers of funds between a merchant, a domestic entity that handles domestic payment transactions, such as a domestic Acquiring Bank (e.g., Merchant Bank 50), and a foreign entity that handles foreign payment transactions, such as a foreign Issuing Bank (e.g., Shopper Bank 51). In one embodiment, a user (e.g. a remote shopper) may use an application executing on a user device 4 in conjunction with a physical or virtual card to perform a domestic purchase. In another embodiment, a user may use the system to perform a Global Traveler Payment (GTP) purchase. The merchant may include a Point of Sale (POS) terminal 5 or an internet connected device accepting online payments (smartphone, tablet, PC, etc.), in which case the merchant may also be referred to herein as "the merchant POS" or "the POS". The Acquiring Bank may also be referred to herein as "the domestic bank", "the domestic financial entity", or "the domestic entity". The Issuing Bank may also be referred to herein as "the foreign bank", "the foreign financial entity", "shopper bank", or "the foreign entity".

In various implementations, the transaction bridge system 2 can additionally act as a conduit for real time communications between a user device 4 (e.g., a device used by a remote shopper) and a merchant device 1 to facilitate remote purchases. In other words, a shopper that is interested in purchasing a product from a physical store of the merchant can interact with the merchant via a real time communication session that is established between merchant device 1 and user/shopper device 4. In some embodiments the communication between the merchant device 1 and user/shopper device 4 is hosted and/or managed by transaction bridge system 2. Alternatively, the transaction bridge system 2 acts as an intermediary for the initial setup of the communication, which is subsequently handed off to a secondary communication network (e.g., hosted by a merchant based server system or a third party communication network).

In an illustrative example, transaction bridge system 2 can receive information from merchant device 1 for a communication session between merchant device 1 and user device 4. In various implementations, merchant device 1 and user device 4 can be computing devices such as desktop computers, laptop computers, mobile computing devices (e.g., mobile phones, tablet computers, etc.), or the like. In various implementations, the information can include the attributes for the communication (e.g., audio only, audio/video, real time stream, recorded video playback, image only) as well as information about the products that the merchant intends to showcase/offer/pitch to the user/customer. The transaction bridge system 2 can use this information to generate a "digital invitation" that can be sent to the user to initiate the communication session between merchant device 1 and user device 4.

In various implementations, the digital invitation can be any form of digital information that can be provided to a user device 4 that allows that device to initiate a real time communication connection with another device (e.g., merchant device 1). For example, the digital invitation can include information that specifies the source of the communication connection (e.g., the server, device, or third party communication network that is hosting the communication session). In some implementations, the digital invitation can include a link that, when accessed by the user, executes an application on the user device 4 to initiate the communication connection. For example, the digital invitation can cause the user device 4 to launch a mobile app installed on the user device 4. Alternatively, the digital invitation can cause the user device 4 to launch a web browser to access an URL for a web application.

The transaction bridge system 2 can then send a "touchpoint" associated with the communication session to the user device 4, where the touchpoint includes the digital invitation. The touchpoint may be a machine readable optical label (e.g., such as a Quick Response (QR) code, a product Universal Product Code (UPC) code, a product Stock Keeping Unit (SKU) #), a radio-frequency readable passive or active device (e.g., a near-field communication) NFC tag, an NFC enabled computing or point-of-sale (POS) device, a radio-frequency identification (RFID) tag, an RFID enabled computing or POS device, or a Bluetooth® enabled computing device or merchant POS device), a product offer, a product coupon, a product promotion, a product image, an email message containing product information and/or a uniform resource locator (URL) link, a text message containing product information and/or a URL link, a message posted to a social media account of a user that includes product information and/or a URL link, a message posted on a web page to a user that includes product information and/or a URL link, or any other specific image (defined for such purpose) using a shopper device camera, and without downloading any app or prior activation of any device resident utility. A product could be one or more items, or one or more services.

In various implementations, transaction bridge system 2 can provide the touchpoint with the digital invitation directly to user device 4. Alternatively, transaction bridge system 2 can provide the touchpoint with the digital invitation to the merchant device (or a merchant server system being accessed by the merchant device), and the merchant device 1 can forward the touchpoint to the user device (depicted as touchpoint 3 in FIG. 1). User device 4 can receive the touchpoint (via the SMS message, email, chat message, etc.), allowing the user to initiate the communication session by interacting with the touchpoint.

In an example, a camera of the user device 4 may scan a machine readable optical label such as a QR code or barcode, or any other specific image received from the merchant device 1 or transaction bridge system 2. In alternative embodiments, the user device 4 could also read a barcode, an Near Field Communications (NFC) contactless passive tag (i.e., normally, with a static value) or NFC contactless active device, a Bluetooth device, a UPC code, a SKU #, a graphic or character based message, an audio sound or message, or a photo image, containing an Uniform Resource Locator (URL) address itself, or an alpha-numerical, or graphical code corresponding to the relevant cloud application(s). In another embodiment, the user of the user device 4 can select a link received in an SMS message, chat message, email, etc. that causes an application to execute on user device 4. Each of these examples is considered to be different possibilities for interactions of the user device 4 with a touchpoint.

Once the user device 4 interacts with the touchpoint (e.g., a QR code or other image is scanned or a link is selected by a user of the device), the user device 4 receives or determines a touchpoint value via the interaction. As mentioned above, the touchpoint value may include a URL and/or other information associated with the communication session. In some examples, the user device 4 may extract the URL and/or other information from the touchpoint value (e.g., from a signal read or received from the touchpoint that contains the touchpoint value, such as by extracting the URL and/or other information from the signal). As noted above, the interaction with the touchpoint can cause the user device 4 to automatically launch an application component (e.g., mobile app on the device, web browser, etc.) of the user device to establish the communication session with the merchant device 1.

The transaction bridge system 2, upon receiving an indication of the interaction with the touchpoint, initiates the communication session between the user device 4 and merchant device 1. As noted above, the communication session can be a live interaction between the user and the merchant, where the merchant can showcase one or more products available in the merchant's physical store that may be available for purchase. In various implementations, the communication session can include a live video stream of the products at the physical store, with the accompanying product information provided to the user. In such instances, the live stream can be forwarded to the user device 4, and the communication session can facilitate live communication between the merchant where the merchant can provide a sales "pitch" to the user, and subsequently receive a purchase request responsive to the live stream, where the purchase request is displayed within the display page as the stream. In various implementations, the merchant can establish the connection with more than a single user device 4 to showcase products to more than one potential customer concurrently, or at approximately the same time.

The transaction bridge system 2 can generate a display page that is customized for the user of user device 2, where the display page includes information pertaining to one or more products available for purchase at the merchant location. For example, transaction bridge system 2 can generate a web based HTML page or other display page (e.g., a Product Display Page [PDP]) within an application on the device can be displayed to the user along with product detail (list of one or more products being offered by the merchant), purchase amount, payment information, shopper name/address/phone number, an option to ship or in-store pick up (default) option. The display page may include the transaction information. The display page may include, but not be limited to, text, one or more images, a video, a video stream, one or more URL links, one or more customer interaction options and/or customer selection options (e.g., optionally presented as buttons, including but not limited to a Pay Button, a Buy Button and/or a Place Order Button), and so on. The display page may include payment information (e.g., a cost for a transaction, an account that will be charged, any discounts, and so on) as well as non-payment information (e.g., a shipping address, a billing address, and so on).

In some implementations, the display page may include one or more payment methods associated with the user, where each of the payment methods is associated with a corresponding payment processor. For example, the transaction bridge system 2 can determine attributes associated with the user of user device 4, and/or attributes of the user device 4 itself, and present different payment options in the display page based on those attributes. In various implementations, the attributes can include a previously used payment method used by the user for previous transactions, banking information associated with the user, location information associated with the user, a preferred payment method for the user stored in a user profile, a device type of user device 4, an application component type associated with the transaction, location information associated with user device 4, an operating system type associated with user device 4, or other similar information.

Transaction bridge system 2 can then send the display page to the application component of user device 4 using the established communication session. The application component of user device 4 can receive the display page and present it to the user of user device 4. As noted above, the display page can facilitate live communication between the merchant and the user regarding one or more products available for purchase at the physical store of the merchant. The communication session can present a live video stream, prerecorded video, or static image(s) of the product(s) with accompanying product information and payment options for the user. Subsequently, should the user decide to purchase one of the products, the user can send select one or more of the featured products for purchase and initiate a purchase order. In some implementations, the user may additional select one of the available payment options displayed in the display page. A purchase order may then be generated and sent to the transaction bridge system 2.

As noted above, the user may select a payment option that is not directly compatible with the payment options supported by the merchant. For example, the merchant may accept credit card payments, but may not directly support payments made via PayPal™ or various international payment methods such as AliPay™, WeChat Pay™, BharatQR. In such instances, the transaction bridge system 2 can act as a bridge between the payment method of the user (e.g., the shopper bank 51 and/or digital wallet bank 53) and the merchant bank 50 by utilizing a merchant payment instrument 10 to facilitate the transfer of payment between the two.

In one embodiment, the transaction bridge system 2 can establish an account with a banking entity (e.g., local bank 8) that is local to the merchant that issues payment instruments (e.g., merchant payment instrument 10) supported by the merchant (e.g., physical credit cards or digital payment tokens for electronic payments). When the user submits an order with a selected payment option not directly supported by the merchant, the display page can be directed to forward payment directly to the selected digital wallet system (e.g., digital wallet 6) selected by the user at the time of purchase. The payment request can be processed by the digital wallet 6 (via interaction with shopper bank 51 and/or digital wallet bank 53). In some implementations, confirmation of payment can be sent by digital wallet 6 to transaction bridge system 2 (e.g., via transfer bank 7) as well as a transfer of funds in the amount of the purchase into the local bank account associated with the merchant payment instrument 10. The merchant, upon receiving confirmation of payment, can subsequently transfer the funds from the local bank account to the merchant bank 50 by utilizing the merchant payment instrument 10 (e.g., via a card swipe at the POS 5 or a digital token stored on the POS 5 system that confirms payment).

In one embodiment, the transaction bridge system 2 can capture card swipe information (card number, merchant ID, terminal ID, and/or total amount, etc.) from the merchant POS and transfers the information to the domestic bank via a payment network such as the VISA™, Discover™, or MasterCard™ network (aka merchant card network). This US portion of the transaction goes through the normal authorization process to verify that the card has sufficient funds. In one embodiment, the local bank 8 will have created the equivalent of a prepaid card for the exact amount, in which case the local bank 8 will respond to the authorization request with an indication that there is enough money in the account. In this manner, the transaction bridge system 2 operates to create an instant account on the merchant payment instrument 10. Once the local bank 8 processes the authorization, the exact amount is removed from the card, and the card will again have no value.

In one embodiment, during settlement, funds are moved from the user's account to an intermediary account that is controlled by the transaction bridge system 2, which may be an account in the user's home country, the country being visited, or in another country. For example, funds may be moved from a user's account to a WeChat Pay™ holding bank account in a Chinese bank, then ultimately to the US bank account of the merchant card (merchant payment instrument 8) issuer.

Once payment has been received and processed, transaction bridge system 2 can send confirmation to user device 4 that indicates completion of the purchase transaction. Subsequently the merchant can ship the merchandise from the physical store to the buyer. Alternatively, the purchaser can specify in the purchase order that the merchandise is to be picked up. In the latter case, in some embodiments, the payment can be performed at the time of pickup rather than at the time of purchase.

In some implementations, the architecture depicted in FIG. 1 can be utilized to support remote payments that do not incorporate a live communication stream. In an illustrative example, a shopper at a remote location wishes to make a purchase from a physical retail store. The shopper discovers merchant offerings from an ad or the WeChat™ social media platform (e.g., a story, look, moment, share, post, etc.) provided by the transaction bridge system 2 (e.g., Omnyway™ platform) and distributed to WeChat™ in a variety of channels (apps, ads, devices, groups, chats, etc.). The shopper communicates with the retail associate an intent to purchase an item over text, email, chat (e.g., iMessage™, Facebook Message™, WeChat™, etc.), direct message, phone call, or the like. The retail associate gathers the items and rings up the total amount for the sale. The retail associate opens a web app to generate a secure, one-time usage QR Code for the amount of the sale for that store location. The QR Code may also be associated with a specific merchant card. The QR Code can be communicated back to the shopper over text, email, chat, WeChat™, DM, phone, app, device, or the like. The shopper scans the QR Code with WeChat™ and the transaction bridge system (e.g., Omnyway™ OPS) payment app within WeChat™ for the shopper is executed. The shopper authorizes the amount using pin, or biometric identification. The retail associate processes the merchant card at the POS for the amount of the sale. In the background, the transaction bridge system receives the money from the shopper's WeChat Pay™ account and has set the proper controls on the merchant payment instrument (e.g., merchant card) for the sale. Once sale is approved by the POS, the shopper receives a digital receipt from the transaction bridge system 2 via the WeChat™ app. The merchant is then paid over standard card network rails (e.g., network 9).

In some implementations, the above example can utilize a universal or "liquid" QR code that is not associated with a particular payment method and that can be used to determine payment methods for a user at the time of sale based on attributes associated with the user or the user's device. In such instances, when the transaction bridge system 2 receives an indication that the user has interacted with the liquid QR code (e.g., when the shopper scans the QR code received in the message sent by the transaction bridge system 2), a payment method can be determined based on the interaction. In some implementations, the transaction bridge system 2 can determining one or more attributes associated with the user of the user device 4, such as a previously used payment method used by the user for previous transactions, banking information associated with the user, location information associated with the user, or a preferred payment method for the user stored in a user profile. Additionally, or alternatively, transaction bridge system 2 can determine one or more attributes associated with the user device 4, such as a device type, an application component type associated with the transaction, location information associated with the computing device, or an operating system type associated with the computing device. The attribute information can then be used to determine the most appropriate method of payment for that user.

For example, if the user has used PayPal as a method of payment for previous transactions, the transaction bridge system 2 can select PayPal for the present transaction. In another example, if the user has contact information that indicates that user lives in China, then the transaction bridge system 2 may not select a U.S. method of payment, and select WeChat Pay instead. Similarly, if the device location information indicates that the device is currently in China, WeChat Pay may also be selected. In other implementations, other payment options may be selected based on other attributes of the device and/or the user.

In some implementations, the above architecture may also be used to initiate product returns for remote users. In such instances, communication can be established between the user device 4 and the merchant device 1 to initiate the return process. In some implementations, the transaction bridge system 2 can send a digital invitation to the user device 4 as described above, where the invitation causes the application component of user device 4 to launch an application component on the device to initiate the communication connection. The transaction bridge system 2 can then provide a display page to the application component of user device 4 to begin the return process. Once the return has been processed, the transaction bridge system 2 can process the refund can be processed in a similar fashion to that described above, only in reverse. Thus, the transaction bridge system 2 can initiate a request to the merchant bank 50 to retrieve funds for the refund and deposit those funds with the local bank 8 via the merchant payment instrument 10 (e.g., swiping the merchant card at the POS terminal 5 to transfer funds from the merchant bank 50 to the local bank 8 account). Subsequently, the transaction bridge system can initiate a funds transfer from the local bank 8 to the digital wallet 6 of the user via the transfer bank 7.

The merchant computes the amount of the refund for the user, and opens an application on the merchant device 1 for generating a refund (e.g., via a web app in a browser, a dedicated application component on the device, etc.). The merchant creates a temporary QR Code for this retailer, store and amount. The generated QR Code may be time bound, having the amount of the refund and the retailer/store-id where the return is occurring. The merchant can then ask the user to scan the QR Code using their digital wallet application component (e.g., WeChat™, PayPal™, etc.). Once the user scans the QR code, using the digital wallet application component, the application component is opened on the device to a "receipts" display page. The shopper can then select on the original transaction receipt (the receipt must have equal or more amount left in its balance to cover the return). If the receipt is found to cover the return, the refund is marked as valid and an API call is sent to the transaction bridge system 2 with the original receipt transaction id, amount to refund, id of the return QR Code scanned. If there is only one receipt, it can be selected by the system automatically.

The transaction bridge system 2 can then send a message to the shopper that the refund has been initiated. A message can also be sent to the store associate that the refund has been initiated.

The merchant can then initiate a refund at the POS, selecting "Original Form of Payment" as the refund type which immediately sends refund back to the merchant card using the card network rails (e.g., network 9). The transaction bridge system 2 then matches up the merchant card refund signal from that retailer with the digital wallet refund signal from the QR Code scan. Once the transaction bridge system 2 identifies a matching transaction, the refund can be sent back to the shopper's digital wallet account. Once the refund is initiated using the digital wallet refund, the shopper will receive a message from the digital wallet indicating the refund is in progress.

FIGS. 2A-2E illustrate an example video stream-based remote purchasing experience, in accordance with an embodiment of the present disclosure. In some implementations, the video stream-based purchasing experience can be performed within an application component of a computing device (e.g., a mobile computing device). Alternatively, the video stream-based purchasing experience can be performed from a computing device (e.g., a mobile computing device) that does not have an activated or installed payment application component (e.g., does not have a mobile payment application installed thereon or does not include a mobile payment application that has been activated).

Figure 2A:
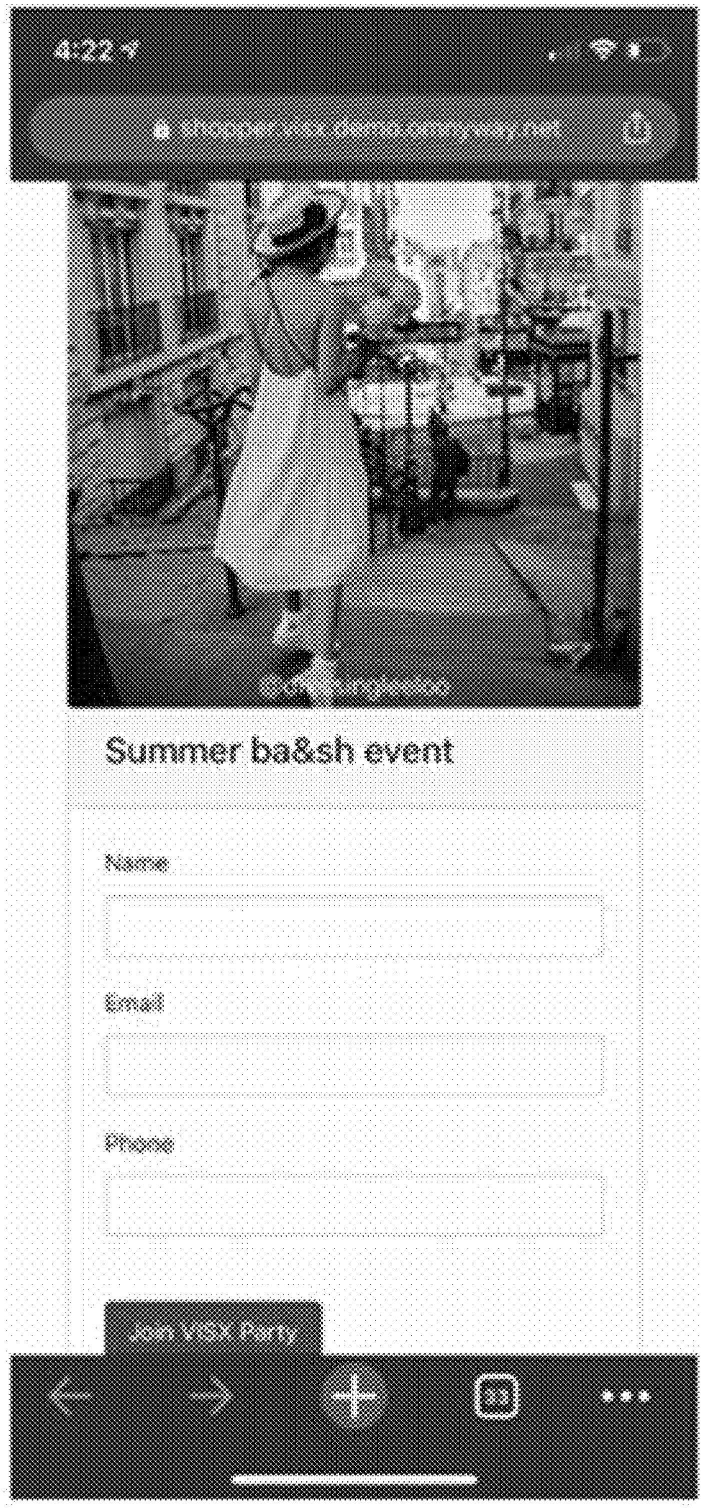
FIGS. 2A-2E illustrate an example video stream-based purchasing experience, in accordance with an embodiment of the present disclosure.

FIG. 2A illustrates a landing page that is loaded by a web page of the consumer's computing device (e.g., mobile web browser) after clicking a URL link received by the consumer. The URL link may have been received from a touchpoint as described above. After accessing the URL link (e.g., clicking on the URL link), the web browser loads the landing page and may enter a product event. At the landing page, the consumer may enter their name, email address, phone number and/or other personal information to generate a new account. If the consumer already has an account, the landing page may be skipped.

Figure 2B:

Once the user has a user account, the web page begins receiving a video stream of one or more products and/or services that can be purchased, as shown in FIG. 2B. If the consumer was already known (e.g., has an account that the web browser may automatically log into), the landing page of FIG. 2A may be skipped, and the web page may load the web page with the video stream. The web page with the video stream may include a chat bar that the consumer may type questions into to interface with a merchant of a shown product/service. A list price and/or discounted event price for the displayed product/service may be listed in the web page along with information about the product/service, such as colors, size, patterns, options, and so on. A "Bag" button may also be included in the web page, which the consumer may press to purchase the shown product/service.

Figure 2C:
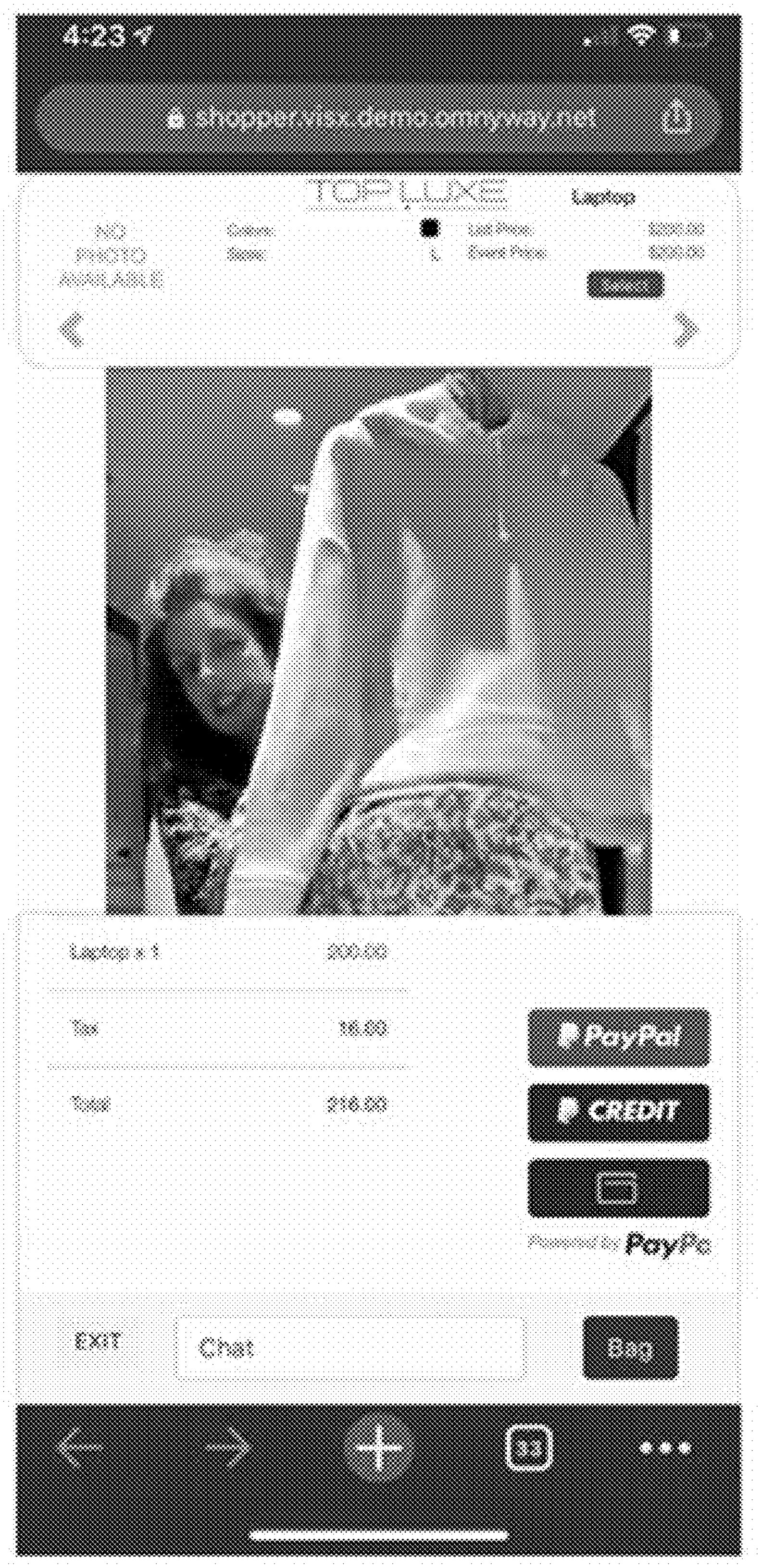

FIG. 2C illustrates the web page with a pop-up that provides transaction information such as total cost and payment options, which may be presented on the computing device responsive to the consumer interfacing with (e.g., clicking on) the "Bag" button.

Figure 2D:
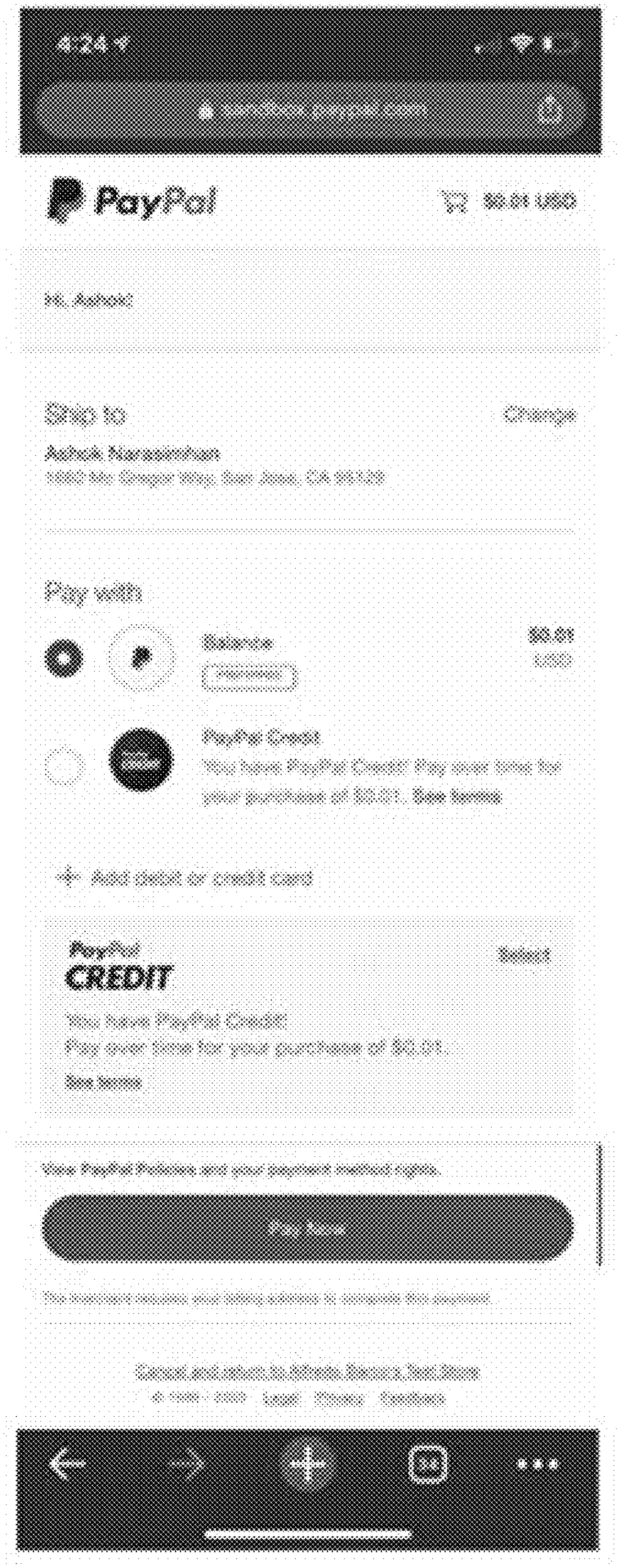

One of the illustrated payment options is to pay via a payment platform (e.g., such as PayPal®). FIG. 2D illustrates further payment details associated with a selected payment platform, and includes information such as shipping information and payment details, and includes an option to proceed with the transaction (e.g., make the payment).

Figure 2E:
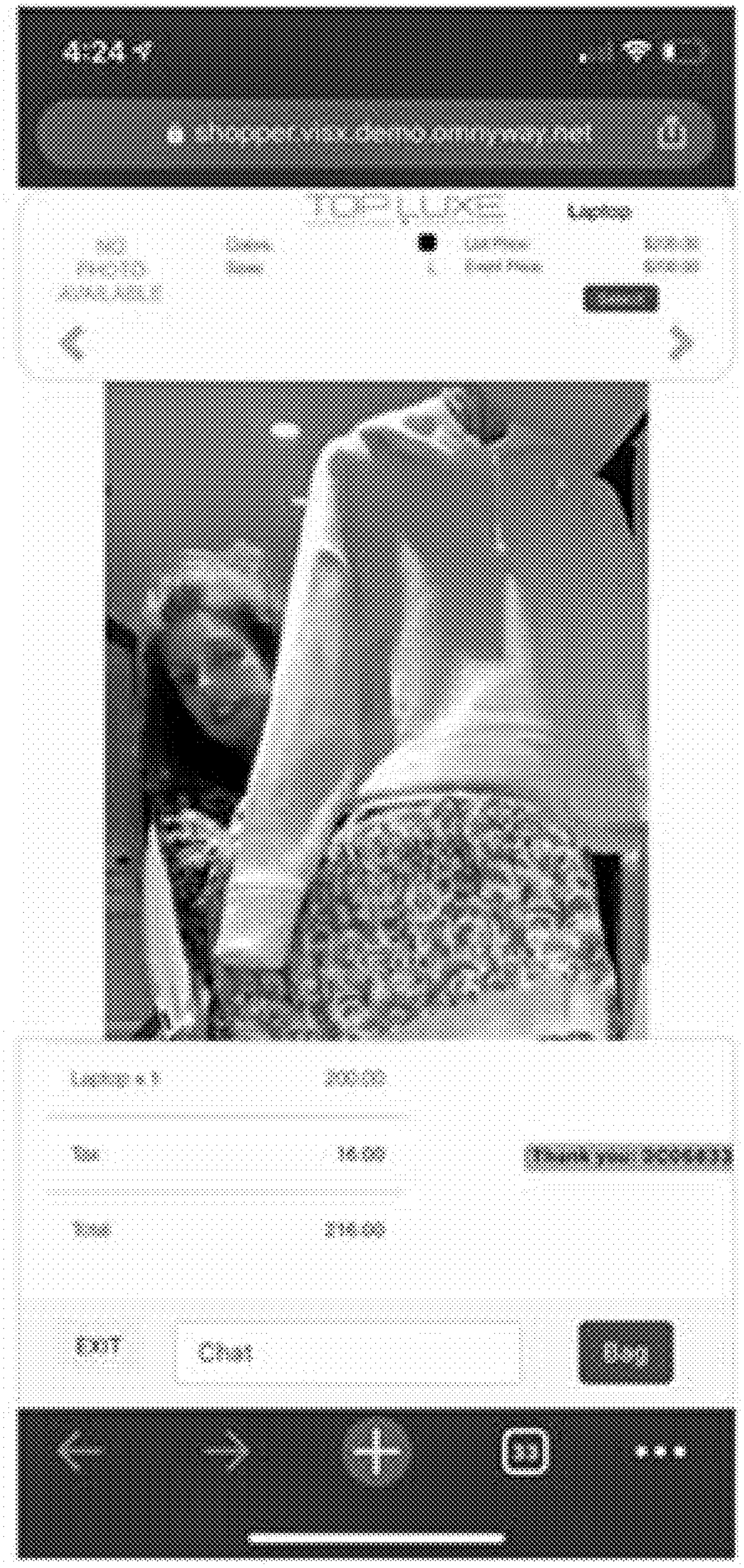

FIG. 2E illustrates a screen shot of the web page showing confirmation that the transaction is complete (e.g., that the payment was successful). The consumer may then receive a confirmation message (e.g., text message and/or email).

FIGS. 3A-3I illustrate an example remote purchasing experience that doesn't include a video stream, in accordance with an embodiment of the present disclosure. In some implementations, the purchasing experience can be performed within an application component of a computing device (e.g., a mobile computing device). Alternatively, the video stream-based purchasing experience can be performed from a computing device (e.g., a mobile computing device) that does not have an activated or installed payment application component (e.g., does not have a mobile payment application installed thereon or does not include a mobile payment application that has been activated).

Figure 3C:
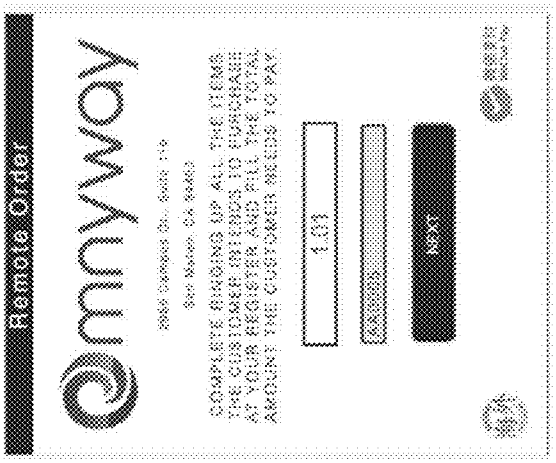
FIGS. 3A-3C illustrate an example of a user interface for the merchant user, in accordance with an embodiment of the present disclosure.
Figure 3B:
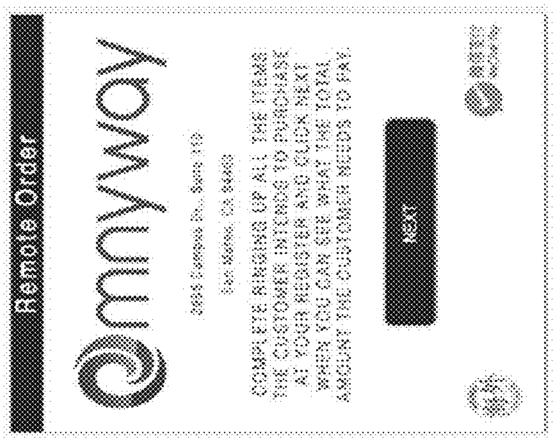
Figure 3A:

FIGS. 3A-3C illustrate an example of a user interface for the merchant user (retailer store associate) to provide a remote transaction QR Code with payment instrument to a shopper with a digital wallet. FIG. 3A illustrates a landing page for a merchant user interface that is loaded by the merchant device (e.g., by mobile web browser or mobile app native to the device). Selection of the button "proceed to payment" causes the application to proceed the display page depicted in FIG. 3B. FIG. 3B illustrates a display page to notify the merchant user to ring up items for purchase. Upon determining the total amount of purchase, when the merchant user selects the "next" button, the application proceeds to the display page depicted in FIG. 3C. FIG. 3C illustrates a display page that allows the merchant user to enter the total amount for the purchase. Selection of "next" initiates a communication with the user device of the purchaser to authorize the purchase.

Figure 3F:
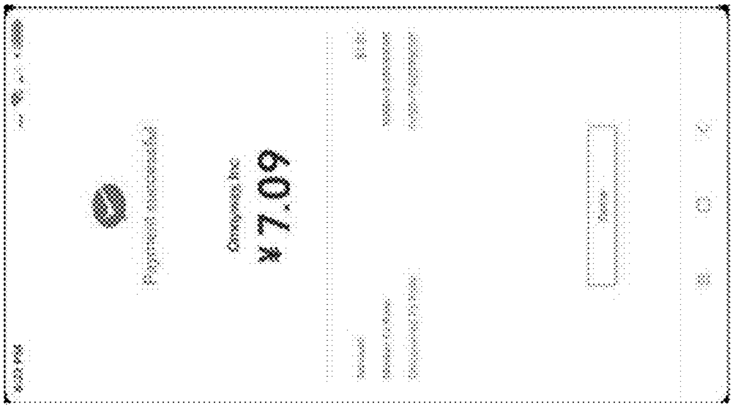
FIGS. 3D-3F illustrate an example of a user interface for the consumer to approve the payment of a specific amount with a digital wallet to a retailer store using a secure remote payment at the physical store location, in accordance with an embodiment of the present disclosure.
Figure 3E:
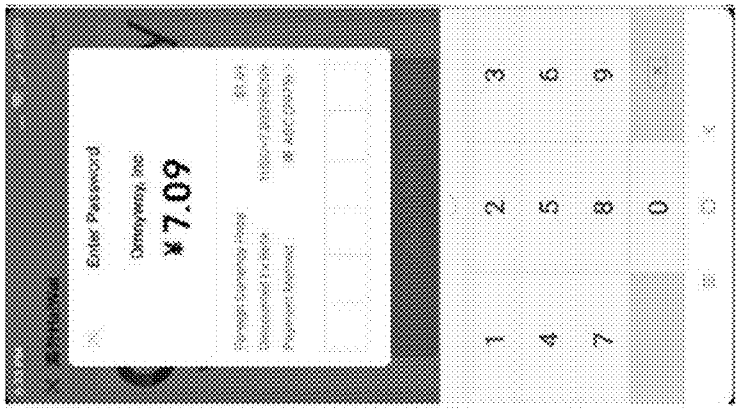
Figure 3D:
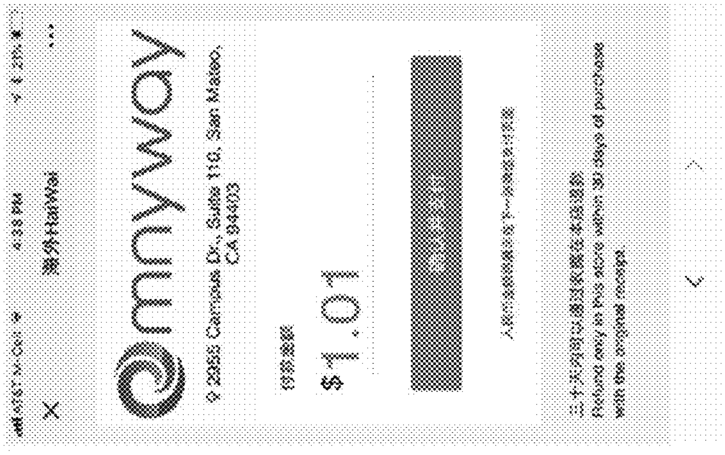

FIGS. 3D-3F illustrate an example of a user interface for the consumer to approve the payment of a specific amount with a digital wallet to a retailer store using a secure remote payment at the physical store location. FIG. 3D illustrates a landing page for a consumer user interface that is loaded by the consumer device (e.g., by mobile web browser or mobile app native to the user device of the shopper). As shown, the total cost of the purchase order depicted in FIG. 3D matches the amount from the total depicted by the merchant user interface in FIG. 3C. It should be noted that while the total depicted in FIGS. 3C-3D is in U.S. Dollars, in other implementations where the merchant is outside the U.S. (or that doesn't accept U.S. Dollars) other currencies may be shown. The example depicted in FIG. 3D indicates that the purchaser is in China (or native to China). Selection of the button immediately below the amount causes the application to proceed the display page depicted in FIG. E FIG. 3E illustrates a display page to notify the consumer user the total amount converted to the currency local to the user as well as the exchange rate and payment method for that user. Additionally, the display page prompts the user to enter a password to accept the amount of the purchase. Upon entry of the password, the application proceeds to the display page depicted in FIG. 3F. FIG. 3F illustrates a display page that presents a confirmation of the payment sent by the consumer.

Figure 3H:
FIGS. 3G-3H illustrate an example of a user interface for the merchant that indicates to the merchant when to use the merchant payment instrument at the merchant's point of sale terminal to complete the payment, in accordance with an embodiment of the present disclosure.
Figure 3G:

FIGS. 3G-3H illustrate an example of a user interface for the merchant that indicates to the merchant when to use the merchant payment instrument at the merchant's point of sale terminal to complete the payment. FIG. 3G illustrates a display page to notify the merchant user that the funds for the purchase have been transferred from the purchaser's wallet banking account to the merchant payment instrument account managed by the transaction bridge system. Upon receiving this display page, the merchant can swipe the merchant card at the merchant's point of sale terminal to transfer the funds to the merchant's bank account. Once the transfer has completed, the transaction bridge system causes the merchant device to proceed to the display page in FIG. 3H, which confirms the payment has been completed.

Figure 3I:
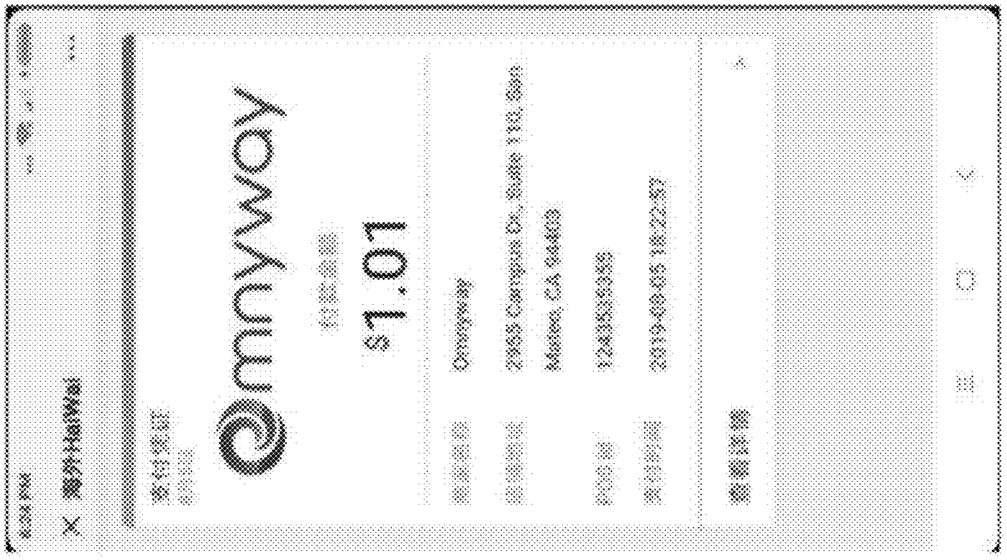
FIG. 3I illustrates an example of a user interface for the consumer that displays the payment completed receipt, in accordance with an embodiment of the present disclosure.

FIG. 3I illustrates an example of a user interface for the consumer that displays the payment completed receipt.

Figure 4:
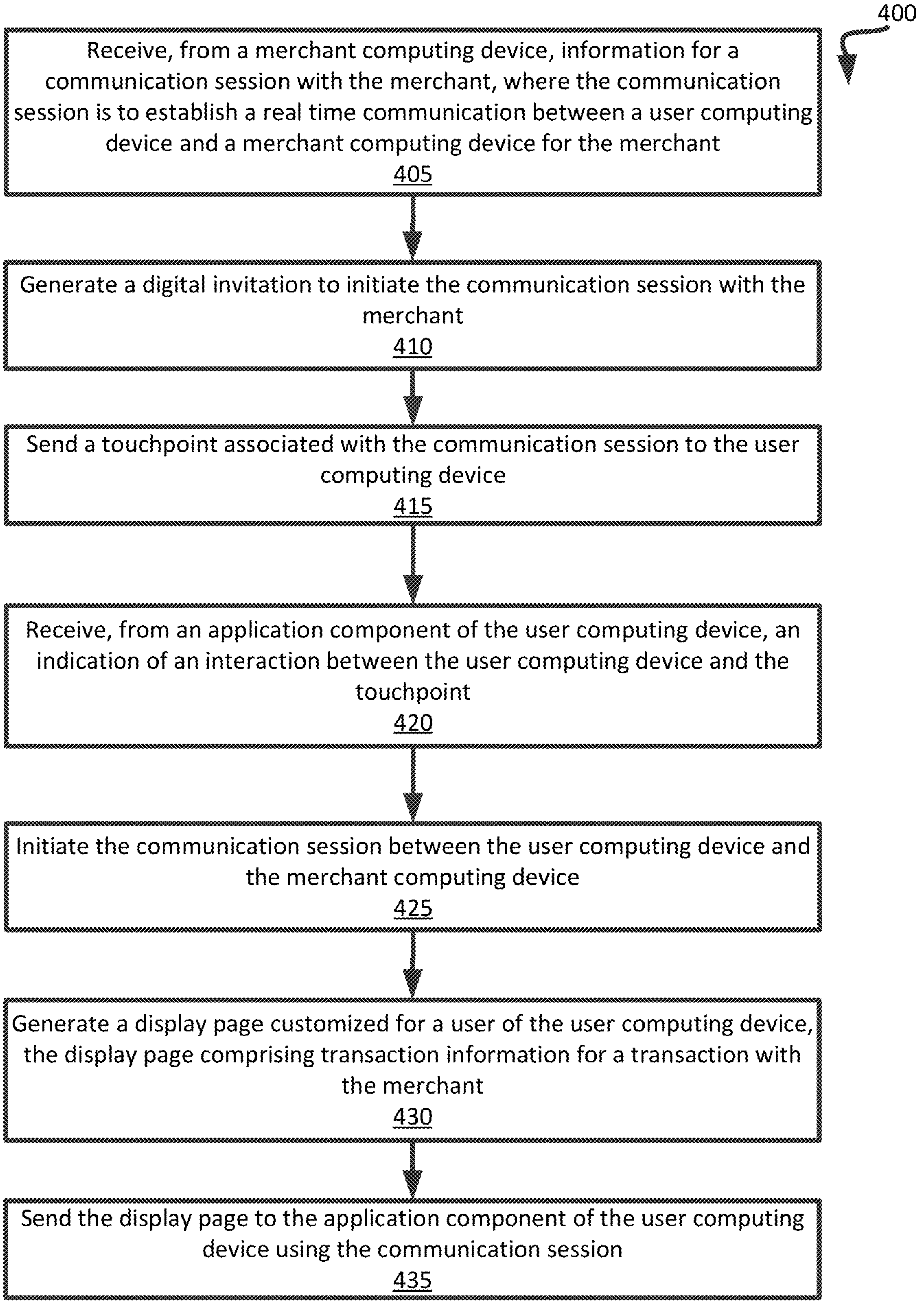
FIG. 4 depicts a flow diagram of an example method for virtual-to-physical secure remote payment to a physical location, in accordance with aspects of the present disclosure.

FIG. 4 depicts a flow diagram of an example method 400 for virtual-to-physical secure remote payment to a physical location. The method may be performed by processing logic that may comprise hardware (circuitry, dedicated logic, etc.), computer readable instructions (run on a general purpose computer system or a dedicated machine), or a combination of both. In an illustrative example, method 400 may be performed by transaction bridge system 2 in FIG. 1. Alternatively, some or all of method 400 might be performed by another module or machine. It should be noted that blocks depicted in FIG. 4 could be performed simultaneously or in a different order than that depicted.

At block 405, processing logic receives, from a merchant computing device of a merchant user and by a transaction bridge server, information for a communication session with the merchant, where the communication session is to establish a real time communication between a user computing device and a merchant computing device for the merchant user. In some implementations, the communication session is a live interaction between the merchant and user shopping for products offered by the merchant. In various implementations the user of the user computing device and the merchant user can be present at different physical locations. For example, the merchant user can be present in the physical store of the merchant, whereas the user of the user computing device can be present in their home (or other physical location that is not the same as the physical store of the merchant). In such instances, the communication session can include receiving an inquiry about a product from the mobile device of the user, forwarding the inquiry to the device of the merchant, receiving a response from the merchant, and displaying the response to the user in in an application component of the user computing device.

In some implementations, the communication session can include receiving a live stream of a product sale pitch from the merchant computing device, forwarding the sales pitch to the user computing device, receiving a purchase request responsive to the live stream, where the purchase request for a product is displayed in the live stream, and initiating a transaction for the purchase of the displayed product.

At block 410, processing logic generates, by the transaction bridge server, a digital invitation to initiate the communication session with the merchant. At block 415, processing logic sends, by the transaction bridge server, a touchpoint associated with the communication session to the user computing device, wherein the touchpoint comprises the digital invitation. At block 420, processing logic receives, from an application component of the user computing device, an indication of an interaction between the user computing device and the touchpoint, the indication comprising a request to access the digital invitation.

In some implementations, the touchpoint can be a machine readable optical label. In such instances, the indication of the interaction between the user computing device and the touchpoint is received responsive to a camera of the mobile computing device scanning the machine readable optical label. In other implementations, the touchpoint can be an email or a text message. In such instances, the indication of the interaction between the computing device and the touchpoint is received responsive to the user computing device interacting with contents of the email message or the text message. In other implementations, the touchpoint can be a message posted to a social network account of the user on a social network service. In such instances, the indication of the interaction between the user computing device and the touchpoint is received responsive to the user computing device interacting with contents of the message posted to the social network account.

At block 425, processing logic initiates the communication session between the user computing device and the merchant computing device. At block 430, processing logic generates a display page customized for a user of the user computing device, the display page comprising transaction information for a transaction with the merchant. In some implementations, the transaction is a purchase transaction, where the transaction information comprises information pertaining to one or more products at a merchant location available for purchase from the merchant. In some implementations, the display page includes at least one of a real time video stream of the one or more products, a video playback of a prerecorded video of the one or more products, or a digital image of the one or more products. In some implementations, processing logic generates the display page by determining one or more payment methods associated with the user, where each of the one or more payment methods is associated with a corresponding payment wallet provider (e.g., BharatQR, WeChat Pay™, ApplePay™, PayPal™, or the like), and providing the one or more payment methods to the user on the display page. In various implementations, the user of the user computing device may select a payment wallet provider on the display page to request approval from that payment wallet provider to make a payment for an amount of a purchase order.

At block 435, processing logic sends the display page to the application component of the user computing device using the communication session. In some implementations, processing logic can subsequently receive, from the application component of user computing device, a purchase order comprising a selected portion of the one or more products and a transaction amount for the transaction (e.g., the cost of the selected portion of the one or more products). Processing logic can then receive, from a selected payment wallet provider that is selected by the user for the purchase order of the transaction, a confirmation approving payment for the transaction amount.

Responsive to receiving the confirmation, processing logic can determine whether the merchant can accept payment from the selected payment wallet provider at the point of sale (POS) for the merchant. If so, the payment is provided to the merchant directly. Responsive to determining that the merchant does not accept payment from the selected payment wallet provider, the processing logic determines an alternate payment method that is accepted by the merchant at the POS of the merchant (e.g., VISA™, Discover™, MasterCard™, etc.). The processing logic then transfers payment funds received from the selected payment wallet provider to the alternate payment method, and provides the payment to the merchant at the POS for the merchant using the alternate payment method.

For example, if the payment confirmation is received from WeChat Pay™, the processing logic can determine whether the POS system at the merchant's physical store accepts that method of payment. If so, payment can be provided to the merchant using WeChat Pay™ If, however, the merchant POS system does not accept WeChat Pay™, the processing logic can determine an alternate payment method supported by the POS of the merchant at the merchant's physical store (e.g., VISA™, Discover™, MasterCard™, etc.), and transfer payment funds to that payment method. As described above, the funds can be transferred to a merchant payment instrument (e.g., a VISA™, Discover™, MasterCard™, debit card) that is accepted at the merchant POS. Payment can then be provided to the merchant POS using the alternate payment method. In some implementations, a notification can be provided to the merchant device to indicate to the merchant user to swipe the debit card at the POS terminal. Alternatively, a digital token can be provided to the merchant that can facilitate electronic payment without a card swipe.

Figure 5A:
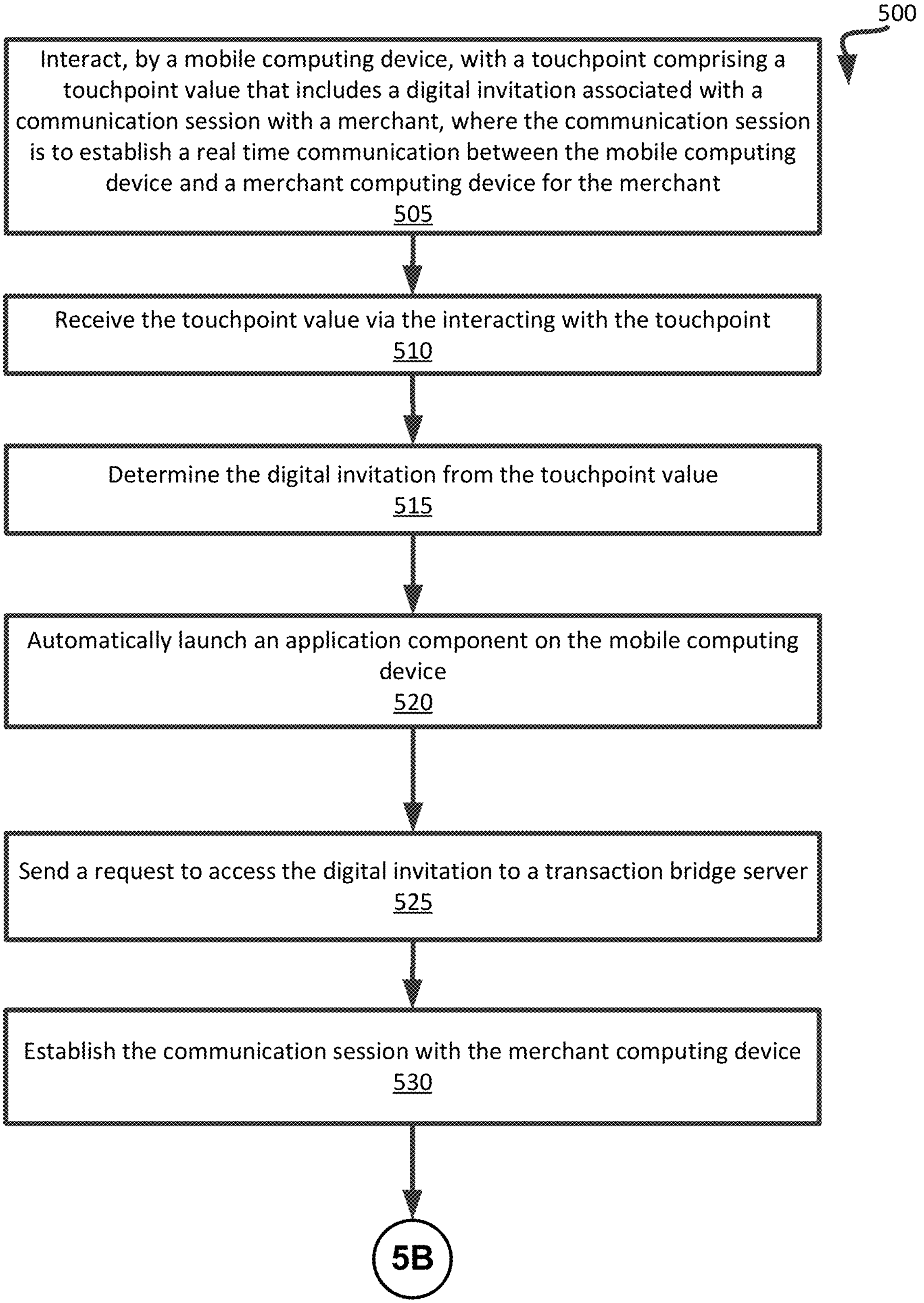
FIGS. 5A-5B depict a flow diagram of an example method for virtual-to-physical secure remote payment to a physical location, in accordance with an embodiment of the present disclosure.
Figure 5B:
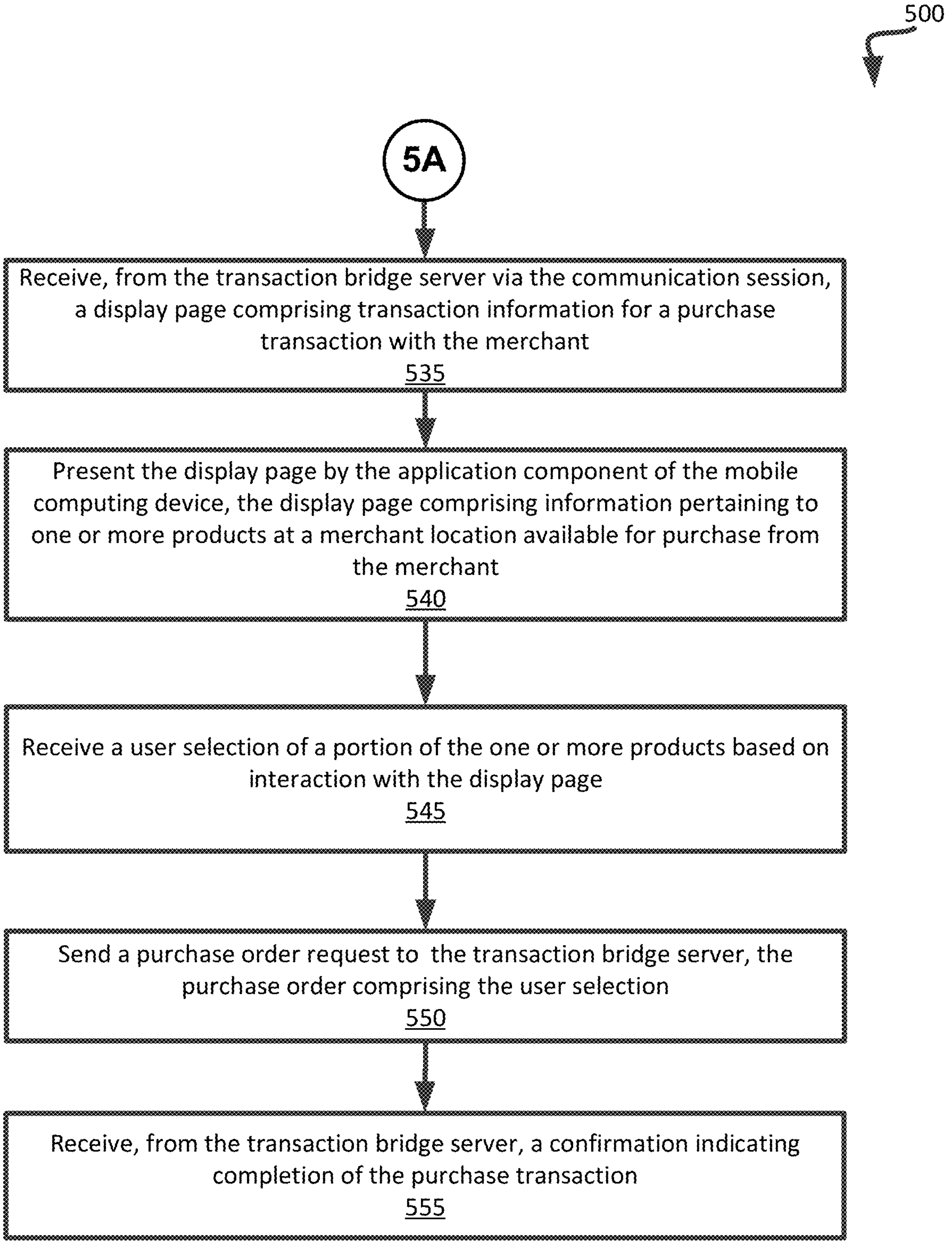

FIGS. 5A-5B depict a flow diagram of an example method 500 for virtual-to-physical secure remote payment to a physical location. The method may be performed by processing logic that may comprise hardware (circuitry, dedicated logic, etc.), computer readable instructions (run on a general purpose computer system or a dedicated machine), or a combination of both. In an illustrative example, method 500 may be performed by user computing device such as the user device 4 in FIG. 1. Alternatively, some or all of method 500 might be performed by another module or machine. It should be noted that blocks depicted in FIG. 5 could be performed simultaneously or in a different order than that depicted.

At block 505, processing logic interacts with a touchpoint comprising a touchpoint value that includes a digital invitation associated with a communication session with a merchant, wherein the communication session is to establish a real time communication between the mobile computing device and a merchant computing device for the merchant. In some implementations, the merchant computing device is at a physical location of the merchant (e.g., a physical store of the merchant) where products are available for purchase. In some implementations, the touchpoint is a machine readable optical label, and interacting with the touchpoint comprises scanning the machine readable optical label using a camera of the mobile computing device, and wherein determining the digital invitation from the touchpoint includes extracting the digital invitation from the machine readable optical label. In some implementations, the touchpoint is an email message or a text message received by the mobile computing device, and interacting with the touchpoint by the mobile computing device includes interacting with contents of the email message or the text message. In some implementations, the touchpoint is a message posted to a social network account of a user of the mobile computing device on a social network service, and interacting with the touchpoint includes interacting with contents of the message posted to the social network account.

At block 510, processing logic receives the touchpoint value via the interacting with the touchpoint. At block 515, processing logic determines the digital invitation from the touchpoint value. At block 520, processing logic automatically launches an application component on the mobile computing device. In some implementations, the application component is at least one of a digital wallet application, a retailer application, a brand associated application, or a payment network application, and interacting with the touchpoint causes the mobile computing device to execute the application component. In some implementations, the application component is a web browser, and interacting with the touchpoint causes the mobile computing device to access a uniform resource locator (URL) address within the web browser.

At block 525, processing logic sends a request to access the digital invitation to a transaction bridge server. At block 530, processing logic establishes the communication session with the merchant computing device. After block 530, processing proceeds to block 535 in FIG. 5B.

At block 535 of FIG. 5B, processing logic receives, from the transaction bridge server via the communication session, a display page comprising transaction information for a purchase transaction with the merchant. In some implementations, the display page is at least one of a real time video stream of the one or more products, a video playback of a prerecorded video of the one or more products, or a digital image of the one or more products.

At block 540, processing logic presents the display page by the application component of the mobile computing device, the display page comprising information pertaining to one or more products at a merchant location available for purchase from the merchant. In some implementations, the display page and purchase are all performed together in the same application component or the same web page of a web browser.

At block 545, processing logic receives a user selection of a portion of the one or more products based on interaction with the display page. At block 550, processing logic sends a purchase order request to the transaction bridge server, the purchase order comprising the user selection. At block 555, processing logic receives, from the transaction bridge server, a confirmation indicating completion of the purchase transaction.

Figure 6:
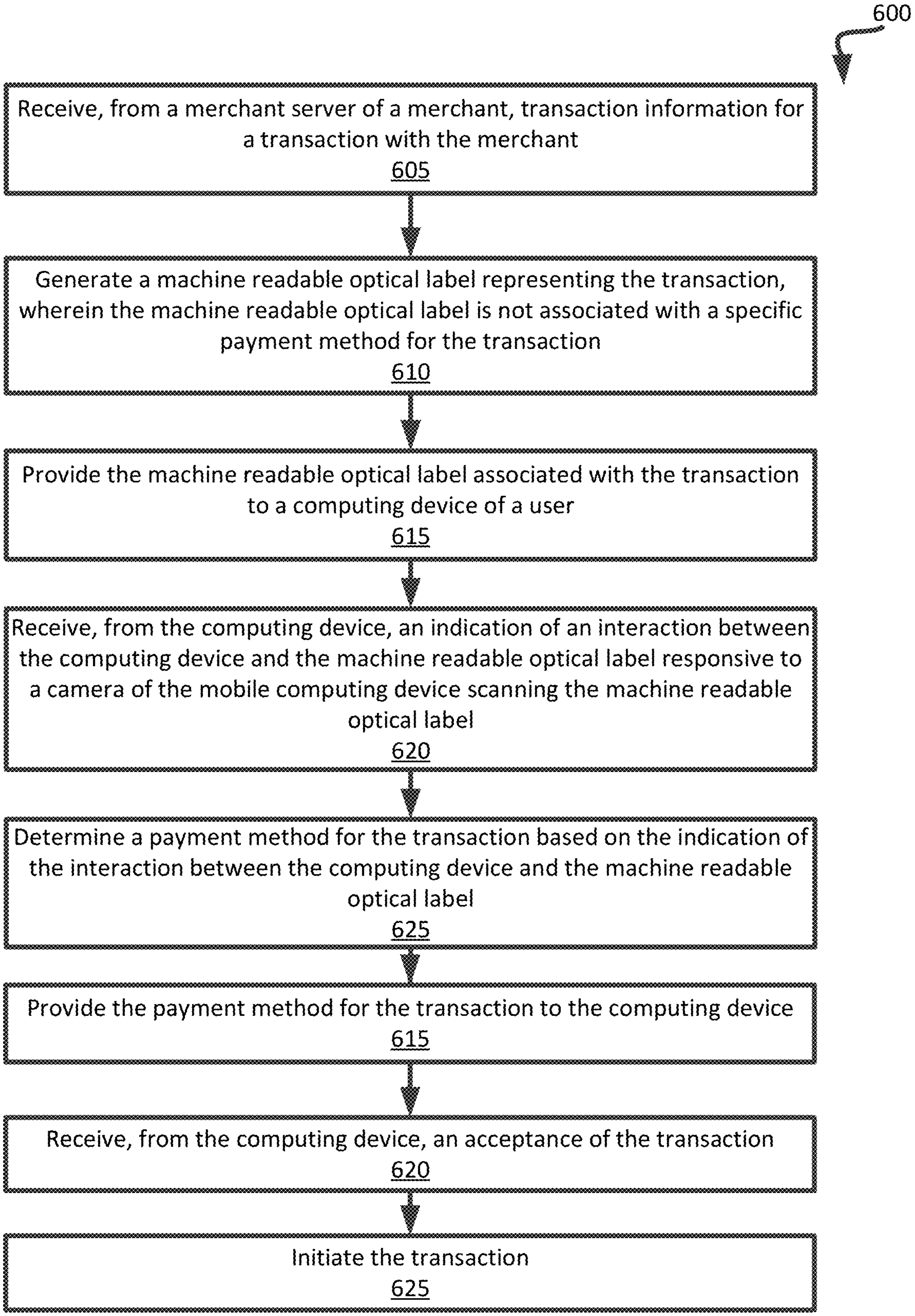
FIG. 6 depicts a flow diagram of an example method 400 for utilizing a universal or "liquid" QR code to determine payment methods, in accordance with an embodiment of the present disclosure.

FIG. 6 depicts a flow diagram of an example method 400 for utilizing a universal or "liquid" QR code to determine payment methods in accordance with aspects of the present disclosure. The method may be performed by processing logic that may comprise hardware (circuitry, dedicated logic, etc.), computer readable instructions (run on a general purpose computer system or a dedicated machine), or a combination of both. In an illustrative example, method 600 may be performed by transaction bridge system 2 in FIG. 1. Alternatively, some or all of method 600 might be performed by another module or machine. It should be noted that blocks depicted in FIG. 6 could be performed simultaneously or in a different order than that depicted At block 605, processing logic receives, from a merchant server of a merchant and by a transaction bridge server, transaction information for a transaction with the merchant. At block 610, processing logic generates, by the transaction bridge server, a machine readable optical label representing the transaction. In some implementations, the machine readable optical label is not associated with a specific payment method for the transaction. In various implementations, the generated machine readable optical label can be static. In other words, the machine readable optical label can be generated once and used for multiple subsequent transactions. For example, a single QR code can be generated and posted at a merchant point of sale for use for multiple different transactions. Alternatively, the machine readable optical label can be generated each time a transaction takes place. At block 615, processing logic provides, by the transaction bridge server, the machine readable optical label associated with the transaction to a computing device of a user. At block 620, processing logic receives, from the computing device, an indication of an interaction between the computing device and the machine readable optical label responsive to a camera of the mobile computing device scanning the machine readable optical label.

At block 625, processing logic determines a payment method for the transaction based on the indication of the interaction between the computing device and the machine readable optical label. In some implementations, processing logic determines the payment method by determining one or more attributes associated with the user of the computing device, where the one or more attributes include at least one of a previously used payment method used by the user for previous transactions, banking information associated with the user, location information associated with the user, or a preferred payment method for the user stored in a user profile. In some implementations, processing logic determines the payment method by determining one or more attributes associated with the computing device, where the one or more attributes comprise at least one of a device type, an application component type associated with the transaction, location information associated with the computing device, or an operating system type associated with the computing device. In some implementations, processing logic determines the payment method using a combination of the attributes associated with the device as well as the attributes associated with the user.

At block 630, processing logic provides the payment method for the transaction to the computing device. At block 635, processing logic receives, from the computing device, an acceptance of the transaction. At block 640, processing logic initiates the transaction.

Figure 7A:
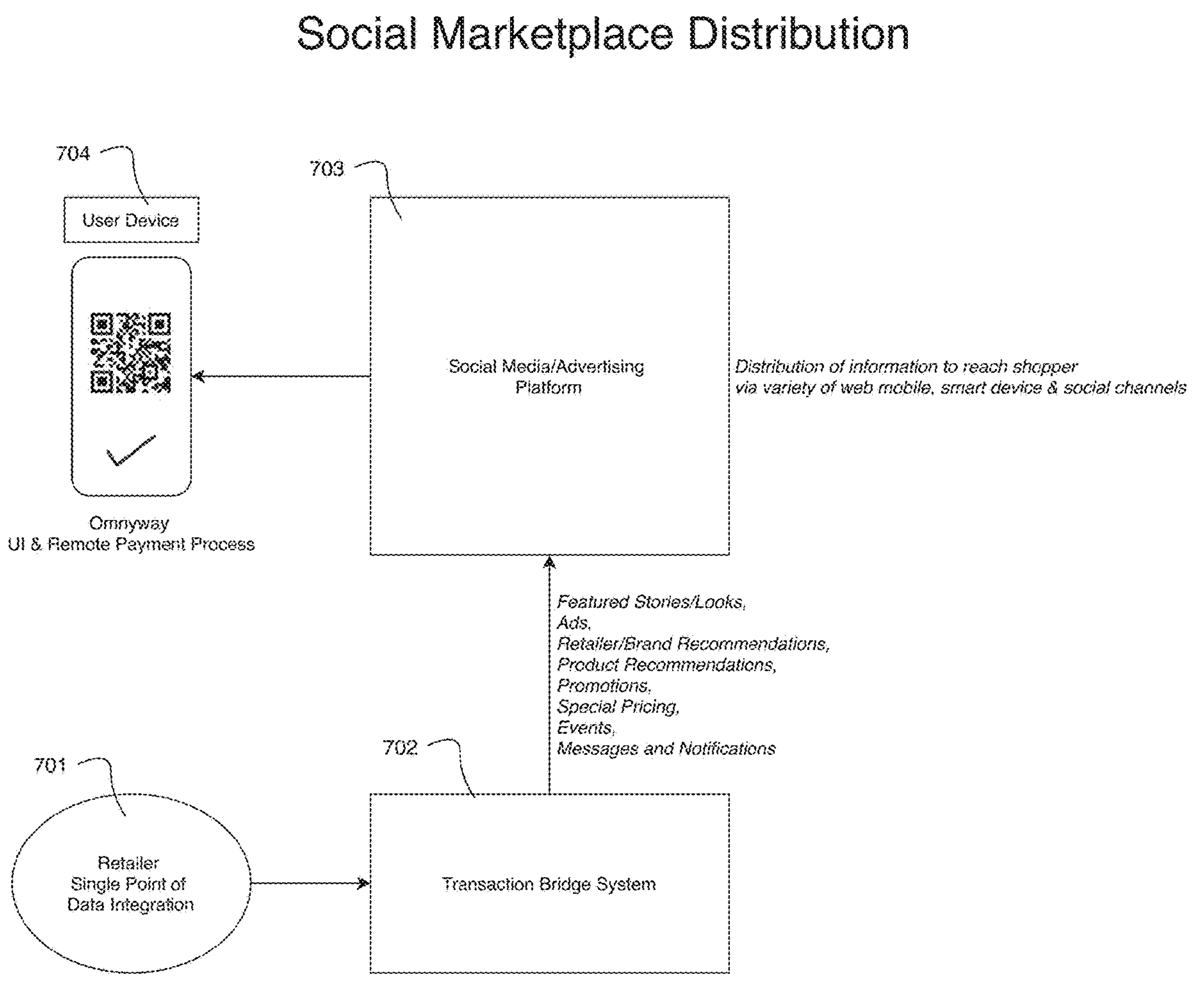
FIG. 7A is a block diagram illustrating an exemplary system for disseminating payment options, personalization, recommendation and intelligent marketing information by a transaction bridge system, in accordance with one or more aspects of the present disclosure.
Figure 7B:
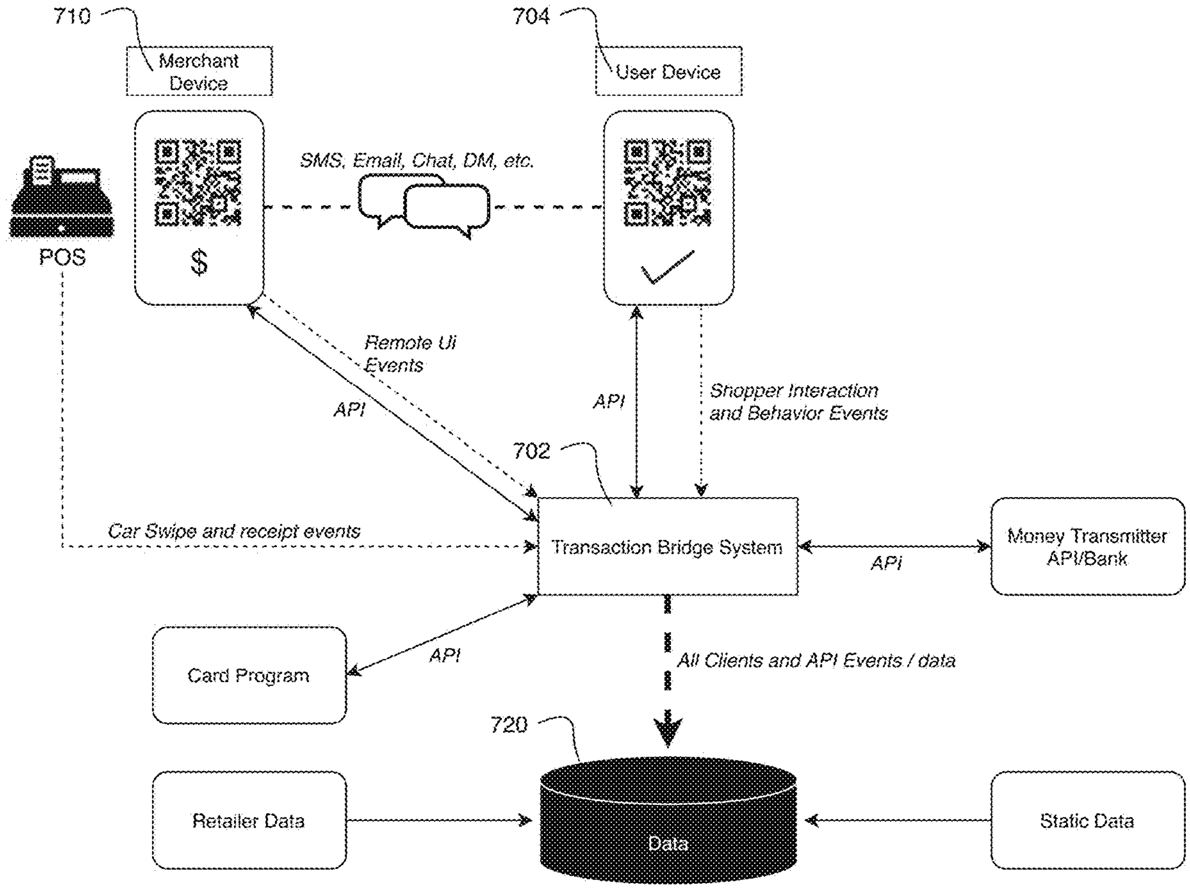
FIG. 7B is a block diagram illustrating an exemplary transaction bridge system architecture for collecting client and event data for use with generating product recommendations, in accordance with one or more aspects of the present disclosure.
Figure 7C:
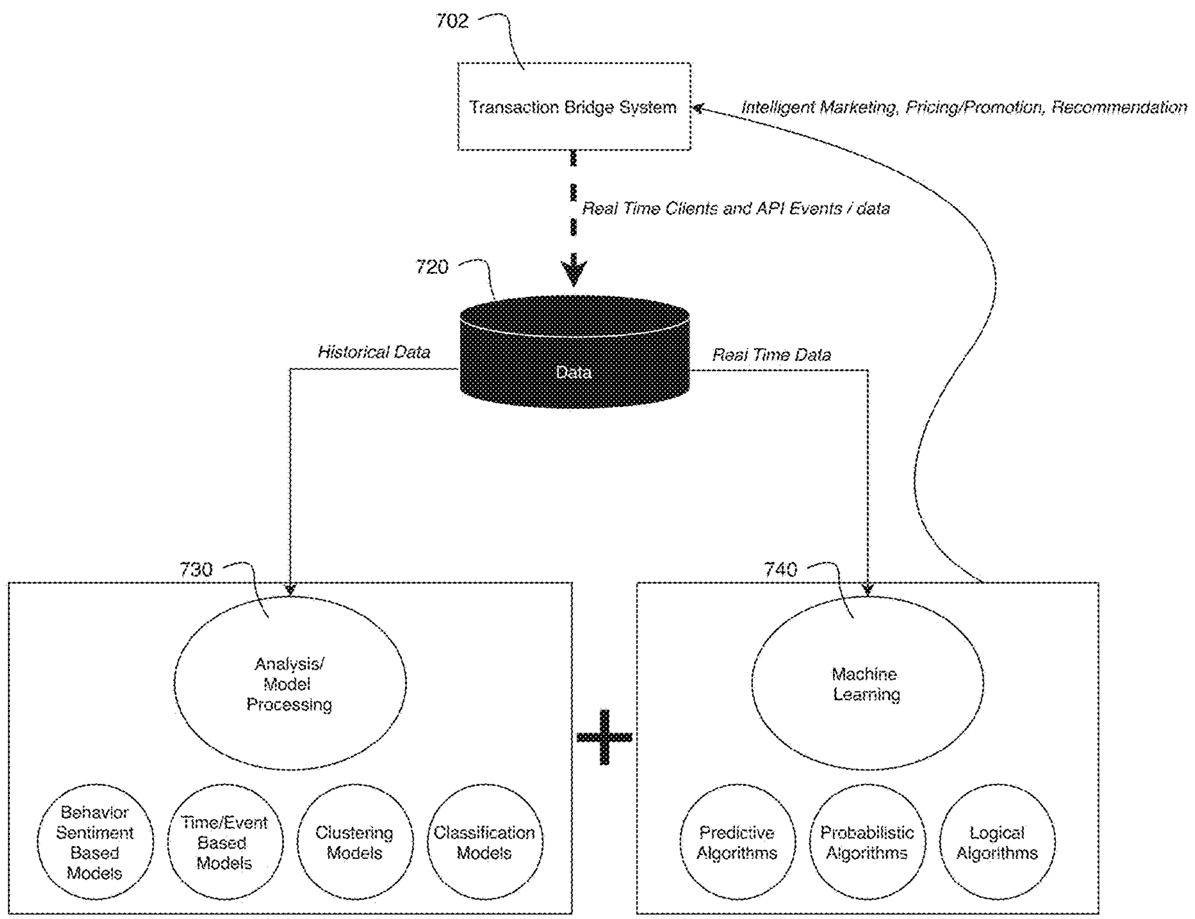
FIG. 7C is a block diagram illustrating an exemplary data analysis sub-system to generate recommendations for a transaction bridge system, in accordance with one or more aspects of the present disclosure.

FIGS. 7A-7C are block diagrams illustrating components of a transaction bridge system that can be used for generating recommendations and disseminating information via social network platforms.

FIG. 7A is a block diagram illustrating an exemplary system for disseminating payment options, personalization, recommendation and intelligent marketing information by a transaction bridge system, in accordance with one or more aspects of the present disclosure. In various implementations, the transaction bridge system 702 can be the transaction bridge system 2 as described above with respect to FIG. 1. As shown in FIG. 7A, transaction bridge system 702 can receive retail data 701 (e.g., data associated with customer profiles, customer purchase history, demographic information, or the like) and analyze that data using machine learning to provide recommendations. In various implementations, the transaction bridge system 702 can analyze the data to generate product recommendations, brand recommendations, retailer recommendations, products at personalized prices, ads, stories and featured stories, events, promotions, and other similar metrics. Once generated, transaction bridge system 702 can generate notifications, messages, and or postings to be provided to social media platforms, web apps, mobile apps and advertising platforms (e.g., social media/advertising platforms 703). In various implementations, the messages/posts can include the digital invitations (touchpoints) used to initiate the communication sessions as described above.

In an illustrative example, the transaction bridge system 2 can determine a recommendation for a product, and post a digital invitation to a social media channel for the merchant offering the product. Potential customers may receive the invitation by subscribing to the appropriate social media channel, and initiate a communication session by interacting with the posting via their user computing device 704 (e.g., mobile phone, tablet, computer, etc.).

FIG. 7B is a block diagram illustrating an exemplary transaction bridge system architecture for collecting client and event data for use with generating product recommendations, in accordance with one or more aspects of the present disclosure. In various implementations, the transaction bridge system 702 can be the transaction bridge system 2 as described above with respect to FIG. 1. As shown in FIG. 7B, transaction bridge system 702 can receive data (e.g., data associated with customer profiles, customer purchase history, demographic information, or the like) from banking entities, retailers, credit card programs/issuers as well as particular merchants via POS interfaces and merchant devices 710 that interact with the transaction bridge system 702.

As described above with respect to FIG. 1, transaction bridge system 702 can manage communication sessions between user device 704 and merchant device 710 to facilitate remote and/or local purchasing of products from the physical location of a merchant. During these communication sessions, when purchase orders are processed, transaction bridge system 702 can receive and or capture various data metrics associated with the merchant, customer, and/or financial networks involved in the process. Such data can be stored in data store 720 to be later used by the transaction bridge system for generating recommendations, advertisements, etc. as described above. In various implementations, transaction bridge system 702 can provide the recommendations, advertisements, etc. directly to the user device 704 (e.g., via automated social media/advertising posts). Additionally, or alternatively, the merchant can interact with the transaction bridge system 702 to obtain recommendations and/or advertisements and send them to particular users via the communication methods described above (e.g., SMS, email, chat, etc.)

FIG. 7C is a block diagram illustrating an exemplary data analysis sub-system to generate recommendations for a transaction bridge system, in accordance with one or more aspects of the present disclosure. In various implementations, the transaction bridge system 702 can be the transaction bridge system 2 as described above with respect to FIG. 1. As shown in FIG. 7C, transaction bridge system 702 can store data metrics (e.g., the data captured as described above with respect to FIGS. 7A-7B) and store in data store 720. Transaction bridge system 702 can subsequently utilize machine learning systems 740 and/or analysis/model processing systems 730 to generate the recommendations and or advertisements described above.

Figure 8:
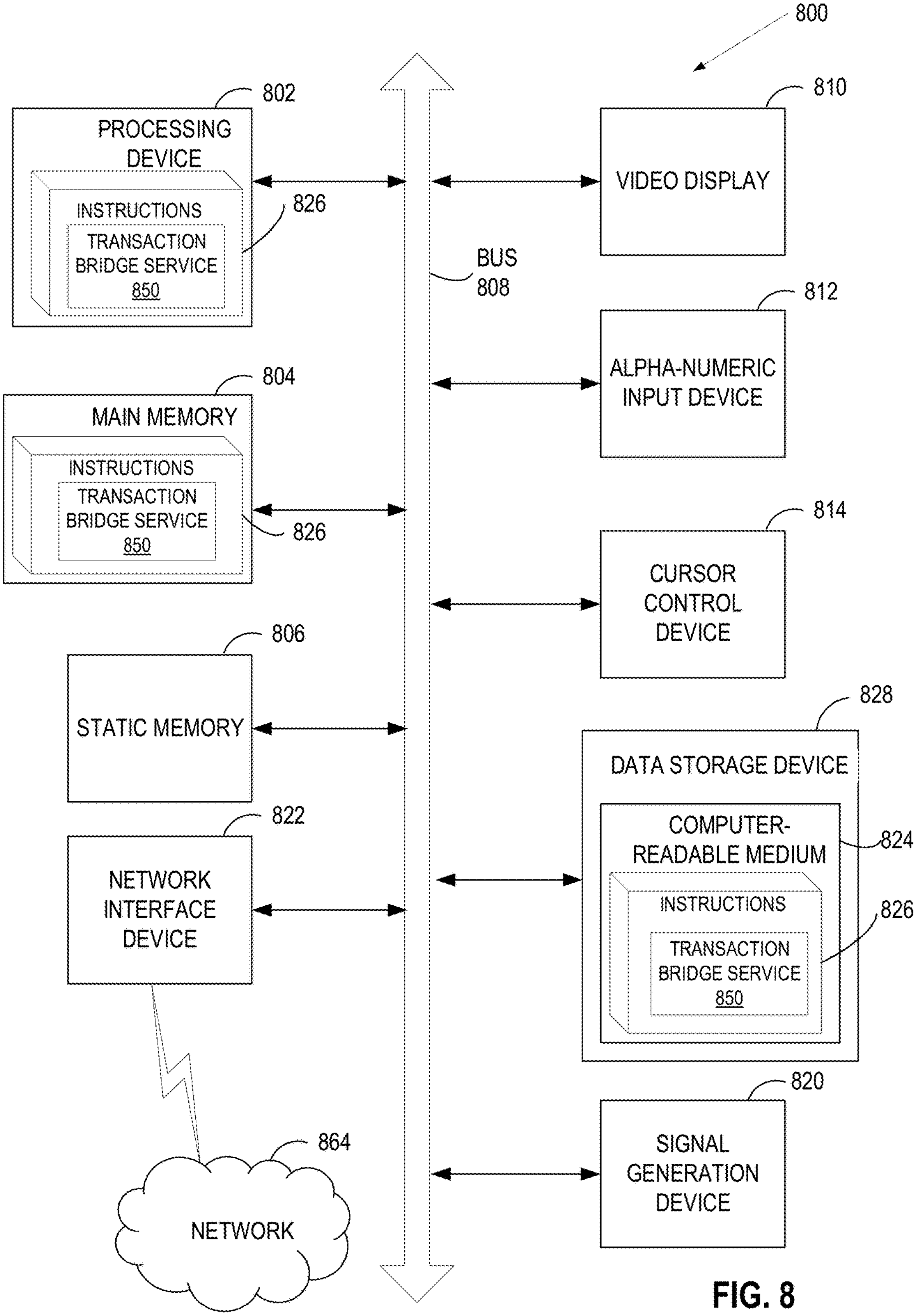
FIG. 8 illustrates a diagrammatic representation of a machine in the example form of a computing device within which a set of instructions, for causing the machine to perform any one or more of the methodologies discussed herein, may be executed.

FIG. 8 illustrates a diagrammatic representation of a machine in the example form of a computing device 800 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory (e.g., a data storage device 828), which communicate with each other via a bus 808.

Processing device 802 represents one or more general-purpose processors such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute the processing logic (instructions 826) for performing operations and steps discussed herein.

The computing device 800 may further include a network interface device 822 for communicating with a network 864. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 828 may include a machine-readable storage medium (or more specifically a non-transitory computer-readable storage medium) 824 on which is stored one or more sets of instructions 826 embodying any one or more of the methodologies or functions described herein. A non-transitory storage medium refers to a storage medium other than a carrier wave. The instructions 826 may also reside, completely or at least partially, within the main memory 804 and/or within the processing device 802 during execution thereof by the computer device 800, the main memory 804 and the processing device 802 also constituting computer-readable storage media.

The computer-readable storage medium 824 may also be used to store instructions for a transaction bridge service 850, which may perform the operations of the transaction bridge system 2 described above with respect to FIG. 1. The computer readable storage medium 824 may also store a software library containing methods that call the instructions for the transaction bridge service 850. While the computer-readable storage medium 824 is shown in an example embodiment to be a single medium, the term "computer-readable storage medium" should be taken to include a single medium or multiple media (e.g., a centralized or distributed database, and/or associated caches and servers)

that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent upon reading and understanding the above description. Although embodiments of the present invention have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:

receiving, by a mobile computing device, a touchpoint value from a touchpoint, wherein the touchpoint value includes a digital invitation associated with a communication session with a merchant;

determining, by the mobile computing device, the digital invitation from the touchpoint value;

sending, by the mobile computing device, a request to access the digital invitation to a transaction bridge server;

establishing, by the mobile computing device, the communication session with a merchant computing device of the merchant;

receiving, by the mobile computing device and from the transaction bridge server via the communication session, a display page comprising transaction information for a purchase transaction with the merchant;

presenting the display page, the display page comprising information pertaining to one or more products at a merchant location available for purchase from the merchant;

receiving, by the mobile computing device, a user selection of a portion of the one or more products based on interaction with the display page; and sending, by the mobile computing device, a purchase order request to the transaction bridge server, the purchase order comprising the user selection, wherein the transaction bridge server enables the purchase order to be completed even in the absence of a commonly supported payment instrument supported by both the mobile computing device and the merchant computing device.

2. The method of claim 1, wherein the touchpoint is a machine readable optical label that is scanned using a camera of the mobile computing device, and wherein determining the digital invitation from the touchpoint comprises extracting the digital invitation from the machine readable optical label.

3. The method of claim 1, wherein the merchant computing device is at a physical location of the merchant.

4. The method of claim 1, wherein the touchpoint comprises an email message or a text message received by the mobile computing device.

5. The method of claim 1, wherein the touchpoint comprises a message posted to a social network account of a user of the mobile computing device on a social network service.

6. The method of claim 1, wherein the display page comprises at least one of a real time video stream of the one or more products, a video playback of a prerecorded video of the one or more products, or a digital image of the one or more products.

* * * * *